(12) United States Patent
Koç et al.

(10) Patent No.: US 7,447,310 B2
(45) Date of Patent: *Nov. 4, 2008

(54) LEAN MULTIPLICATION OF MULTI-PRECISION NUMBERS OVER GF(2M)

(75) Inventors: Çetin K. Koç, Corvallis, OR (US); Serdar S. Erdem, Istanbul (TR)

(73) Assignee: The State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 784 days.

This patent is subject to a terminal disclaimer.

(21) Appl. No.: 10/636,326

(22) Filed: Aug. 6, 2003

(65) Prior Publication Data

US 2004/0109561 A1    Jun. 10, 2004

Related U.S. Application Data

(60) Provisional application No. 60/401,574, filed on Aug. 6, 2002, provisional application No. 60/419,204, filed on Oct. 16, 2002.

(51) Int. Cl.
*H04L 9/28* (2006.01)
*H04K 1/00* (2006.01)
*H04L 9/00* (2006.01)

(52) U.S. Cl. ............................. 380/28; 380/29; 380/30; 708/492

(58) Field of Classification Search .................. 380/28, 380/30; 708/492
See application file for complete search history.

(56) References Cited

U.S. PATENT DOCUMENTS

| | | | | |
|---|---|---|---|---|
| 4,037,093 A | * | 7/1977 | Gregg et al. ................. 708/492 |
| 4,435,823 A | * | 3/1984 | Davis et al. .................. 375/232 |
| 4,754,421 A | * | 6/1988 | Bosshart ...................... 708/625 |
| 4,811,269 A | | 3/1989 | Hirose et al. | |
| 5,220,606 A | * | 6/1993 | Greenberg .................... 380/43 |
| 5,457,804 A | | 10/1995 | Ohtomo | |
| 5,642,367 A | * | 6/1997 | Kao ............................ 714/784 |
| 5,880,985 A | | 3/1999 | Makineni et al. | |
| 6,026,420 A | * | 2/2000 | DesJardins et al. .......... 708/492 |

(Continued)

OTHER PUBLICATIONS

Erdem, Serdar, An Abstract of The Thesis, Improving the aratsuba-Ofman Multiplication Algorithm for Special Applications, Nov. 8, 2001, Oregon State University.*

(Continued)

*Primary Examiner*—Nasser Moazzami
*Assistant Examiner*—David García Cervetti
(74) *Attorney, Agent, or Firm*—Klarquist Sparkman, LLP

(57) ABSTRACT

Multi-precision multiplication methods over $GF(2^m)$ include representing a first polynomial and a second polynomial as an array of n words. A recursive algorithm may be used to iteratively decompose the multiplication into a weighted sum of smaller subproducts. When the size of the smaller subproducts is less than or equal to a predetermined size, a nonrecursive algorithm may be used to complete the multiplication. The nonrecursive algorithm may be optimized to efficiently perform the bottom-end multiplication. For example, pairs of redundant subproducts can be identified and excluded from the nonrecursive algorithm. Moreover, subproducts having weights in a special form may be efficiently calculated by a process that involves storing and reusing intermediate calculations.

38 Claims, 9 Drawing Sheets

U.S. PATENT DOCUMENTS

| | | | |
|---|---|---|---|
| 6,199,087 B1* | 3/2001 | Blake et al. | 708/492 |
| 6,233,597 B1 | 5/2001 | Tanoue et al. | |
| 6,343,305 B1* | 1/2002 | Koc et al. | 708/492 |
| 6,421,807 B1* | 7/2002 | Nakamura et al. | 714/781 |
| 6,466,959 B2* | 10/2002 | Blake et al. | 708/492 |
| 6,687,725 B1* | 2/2004 | Chen et al. | 708/492 |
| 6,766,345 B2* | 7/2004 | Stein et al. | 708/492 |
| 6,993,136 B2* | 1/2006 | Solinas | 380/278 |
| 7,003,106 B2* | 2/2006 | Ouyang | 380/28 |
| 7,031,468 B2* | 4/2006 | Hoffstein et al. | 380/28 |
| 7,069,287 B2* | 6/2006 | Paar et al. | 708/492 |
| 7,082,452 B2* | 7/2006 | Stein et al. | 708/492 |
| 7,111,166 B2* | 9/2006 | Dror et al. | 713/174 |
| 7,133,889 B2* | 11/2006 | Parthasarathy et al. | 708/492 |
| 7,343,472 B2* | 3/2008 | Porten et al. | 712/208 |
| 2001/0024502 A1* | 9/2001 | Ohkuma et al. | 380/46 |
| 2002/0016773 A1* | 2/2002 | Ohkuma et al. | 705/50 |
| 2002/0039418 A1* | 4/2002 | Dror et al. | 380/28 |
| 2002/0041681 A1* | 4/2002 | Hoffstein et al. | 380/28 |
| 2002/0062330 A1* | 5/2002 | Paar et al. | 708/492 |
| 2003/0068037 A1* | 4/2003 | Bertoni et al. | 380/30 |
| 2003/0105791 A1* | 6/2003 | Stein et al. | 708/492 |
| 2003/0110196 A1* | 6/2003 | Stein et al. | 708/492 |
| 2003/0128841 A1* | 7/2003 | Ouyang | 380/28 |
| 2003/0133568 A1* | 7/2003 | Stein et al. | 380/37 |
| 2003/0135530 A1* | 7/2003 | Parthasarathy et al. | 708/492 |
| 2003/0140078 A1* | 7/2003 | Feuser | 708/492 |
| 2003/0206628 A1* | 11/2003 | Gura et al. | 380/28 |
| 2003/0206629 A1* | 11/2003 | Eberle et al. | 380/30 |
| 2003/0212729 A1* | 11/2003 | Eberle et al. | 708/625 |
| 2004/0078411 A1* | 4/2004 | Porten et al. | 708/492 |
| 2004/0107341 A1* | 6/2004 | Hall et al. | 713/161 |
| 2006/0269054 A1* | 11/2006 | Dror et al. | 380/28 |

OTHER PUBLICATIONS

Cormen et al., *Introduction to Algorithms*, MIT, pp. 59-61 (1990).

De Win et al., "A fast software implementation for arithmetic operations in GF(2")," *Advances in Cryptology—ASIACRYPT 96, Proceedings*, pp. 65-76 (1996).

Diffie et al., "New Directions in Cryptography," *IEEE Trans. Information Theory*, pp. 644-654 (1976).

Erdem et al., "A Less Recursive Variant of Karatsuba-Ofman Algorithm for Multiplying Operands of Size a Power of Two," *16th IEEE Symposium on Computer Arithmetic*, 8 pp (2003).

Erdem, "Improving the Karatsuba-Ofman Multiplication Algorithm for Special Applications," Ph.D. Thesis, Oregon State University (2002).

Geddes et al., *Algorithms for Computer Algebra*, Kluwer Academic Publishers, Boston Chapter 4, pp. 111-145 (1992).

Guajardo et al., "Efficient algorithms for elliptic curve cryptosystems," *Advances in Cryptology—CRYPTO 97, Proceedings*, pp. 342-356 (1997).

IEEE P1363, "Standard specifications for public-key cryptography," Draft Version 13 (Nov. 12, 1999).

Johnson et al., "The Elliptic Curve Digital Signature Algorithm (ECDSA)," Technical Report CORR 99-34, Dept. of C&O, University of Waterloo, Canada, 55 pp. (1999).

Karatsuba et al., "Multiplication of Multidigit Numbers on Automata," *Soviet Physics-Doklady*, vol. 7, pp. 595-596 (1963).

Knuth, *The Art of Computer Programming, vol. 2, Seminumerical Algorithms*, Addison-Wesley, Reading, MA, pp. 265-294 (1998).

Koblitz, "Elliptic curve cryptosystems," *Mathematics of Computation*, vol. 48, No. 177, pp. 203-209 (Jan. 1987).

Koç, *High-Speed RSA Implementation: Version 2.0*, RSA Laboratories, 73 pp. (Nov. 1994).

Koç et al., "Montgomery Multiplication in $GF(2^K)$," *Design, Codes and Cryptography*, vol. 14, pp. 57-69 (1998).

Lidl et al., *Introduction to Finite Fields and Their Applications*, Cambridge University Press, New York, NY, pp. 541-566 (1994).

Menezes, *Elliptic Curve Public Key Cryptosystems*, Kluwer Academic Publishers, Boston, MA, pp. 83-99 (1993).

Menezes et al., *Handbook of Applied Cryptography*, CRC Press, Boca Raton, FL, pp. 591-630 (1997).

Miller, "Uses of Elliptic Curves in Cryptography," *Advances in Cryptology—CRYPTO 85, Proceedings*, pp. 417-426 (1985).

Montgomery, "Modular Multiplication Without Trial Division," *Mathematics of Computation*, vol. 44, pp. 519-521 (1985).

Mullin et al., "Optimal Normal Bases in $GF(p^n)$," *Discrete Applied Mathematics*, vol. 22, pp. 149-161 (1988).

National Institute for Standards and Technology, Digital Signature Standards (DSS), FIPS PUB 186-2, 76 pp. (Jan. 2000).

Paar et al., "Fast Arithmetic Architectures for Public-Key Algorithms over Galois Fields $GF((2^n)^m)$," *Advances in Cryptology—EUROCRYPT 97, Proceedings*, pp. 363-378 (1997).

Rivest et al., "A Method for Obtaining Digital Signatures and Public-Key Cryptosystems," *Communications of the ACM*, vol. 21, No. 2, pp. 120-126 (Feb. 1978).

Schroeppel et al., "Fast Key Exchange with Elliptic Curve Systems," *Advances in Cryptology—CRYPTO 95, Proceedings*, pp. 43-56 (1995).

Silverman, "Fast Multiplication in Finite Field GF ($2^N$)," *Cryptographic Hardware and Embedded Systems*, pp. 122-134 (1999).

Office action mailed Apr. 12, 2007 in U.S. Appl. No. 10/636,321, filed Aug. 6, 2003 (published as U.S. Patent Application Publication No. 2004/0098440-A1).

Office action mailed Sep. 29, 2006 in U.S. Appl. No. 10/636,321, filed Aug. 6, 2003 (published as U.S. Patent Application Publication No. 2004/0098440-A1).

* cited by examiner

- Compute the partial result

US 7,447,310 B2

LEAN MULTIPLICATION OF MULTI-PRECISION NUMBERS OVER GF(2M)

CROSS REFERENCE TO RELATED APPLICATIONS

This application claims the benefit of U.S. Provisional Patent Application 60/401,574, filed Aug. 6, 2002, and U.S. Provisional Patent Application 60/419,204, filed Oct. 16, 2002, both of which are incorporated herein by reference.

FIELD OF INVENTION

This application relates to the efficient multiplication of large numbers in a variety of different environments, including cryptography.

BACKGROUND

Performing mathematical operations on large numbers can be a time-consuming and resource-intensive process. One method of handling large numbers involves dividing the numbers into smaller divisions, or words, having a fixed length. Numbers divided in this manner are termed "multi-precision" numbers. In the field of digital circuits, for instance, the binary representation of a large number can be stored in multiple words, wherein each word has a fixed length of n bits depending on the word size supported by the associated hardware or software. Although adding and subtracting multi-precision numbers can be performed relatively efficiently, multi-precision multiplication is much more complex and creates a significant bottleneck in applications using multi-precision arithmetic.

One area that is affected by the complexity of multi-precision multiplication is cryptography. Many cryptographic algorithms, including the Diffie-Hellman key exchange algorithm, elliptic curve cryptography, and the Elliptic Curve Digital Signature Algorithm (ECDSA), involve the multi-precision multiplication of very large numbers. For example, elliptic curve systems perform multi-precision arithmetic on 128- to 256-bit numbers, while systems based on exponentiation may employ 1024- to 2048-bit numbers.

Many cryptographic applications use finite field arithmetic. For example, elliptic curve cryptography typically operates in the finite field $GF(2^m)$ that contains $2^m$ elements, wherein m is a positive integer. The multiplication operation in finite-field applications can be particularly slow and inefficient. Several techniques have been proposed to perform fast arithmetic operations over $GF(2^m)$. One technique, for example, uses an optimized normal basis representation. See R. Mullin et al., *Optimal Normal Bases in $GF(p^n)$*, Discrete Applied Mathematics, Vol. 22, pp. 149-161 (1988). Although optimal normal basis multiplication is efficient in hardware, it is not efficient in software, and an optimal normal basis representation does not exist for all field sizes. Another technique involves embedding $GF(2^m)$ in a larger ring $R_p$ where the arithmetic operations can be performed efficiently. See J. H. Silverman, *Fast Multiplication in Finite Field $GF(2^N)$*, Cryptographic Hardware and Embedded Systems, pp. 122-134 (1999). This method, however, works only when m+1 is a prime, and 2 is a primitive root modulo m+1. Another technique involves using a standard basis with coefficients in a subfield $GF(2^r)$. See E. De Win et al., *A Fast Software Implementation for Arithmetic Operations in $GF(2^n)$*, Advances in Cryptology—ASIACRYPT 96, pp. 65-76 (1996); J. Guajardo and C. Paar, *Fast Efficient Algorithms for Elliptic Curve Cryptosystems*, Advances in Cryptology—CRYPTO 97, pp. 342-356 (1997); and C. Paar and P. Soria-Rodriguez, *Fast Arithmetic Architectures for Public-Key Algorithms Over Galois Fields $GF((2^n)^m)$*, Advances in Cryptology—EUROCRYPT 97, pp. 363-378 (1997). In this method, however, the field size m must be a multiple of r, and look-up tables are required to perform the calculations in $GF(2^r)$. Still another technique involves adapting Montgomery multiplication for the fields $GF(2^m)$. See C. Koc and T. Acar, *Montgomery Multiplication in $GF(2^k)$*, Designs, Codes and Cryptography, 14(1):57-69 (April 1998).

In order to improve the performance of these and other cryptographic systems, improved multi-precision multiplication methods and apparatus are needed.

SUMMARY

Methods and apparatus for multiplying multi-precision numbers over $GF(2^m)$ using a polynomial representation are disclosed. The disclosed methods may be used in a number of different applications that utilize multi-precision arithmetic. For example, the method can be used to generate various cryptographic parameters. In one particular implementation, for instance, a private key and a base point are multiplied using one of the disclosed methods to obtain a product that is associated with a public key. In this implementation, the private key and the base point are multi-precision polynomials. The disclosed methods may similarly be used in a signature generation or signature verification process (e.g., the Elliptic Curve Digital Signature Algorithm (ECDSA)).

In an exemplary embodiment, a method is disclosed that includes representing the first polynomial and the second polynomial as an array of n words, wherein n is an integer. A recursive algorithm is used to decompose a multiplication of the first polynomial and the second polynomial into a weighted sum of iteratively smaller subproducts. A nonrecursive algorithm is used to complete the multiplication when a size of the smaller subproducts is less than or equal to a predetermined size, the predetermined size being at least two words. The recursive multiplication algorithm may be, for instance, a Karatsuba-Ofman algorithm, and the predetermined size may be, for example, six words. The nonrecursive multiplication algorithm may be optimized so that it operates more efficiently. For example, the nonrecursive algorithm may exclude pairs of redundant subproducts, or store and reuse previously calculated intermediate values. The previously calculated intermediate values may be part of a weighted sum of subproducts having special weights. For example, these subproducts may have weights z of the form $\sum_{j=0}^{n-1} z^{i+j}$ for $i=0, \ldots, n-1$, where i and j are index integers.

In another exemplary embodiment, a method of nonrecursively multiplying a first polynomial and a second polynomial over GF(2) is disclosed. A first polynomial and a second polynomial are represented as n words, where n is an integer greater than one. A partial result is determined by calculating a weighted sum of one-word subproducts having weights z of the form $\sum_{j=0}^{n-1} z^{i+j}$ for $i=0, \ldots, n-1$, wherein i and j are index integers. The partial result is updated by adding any remaining one-word subproducts. The method may also include identifying and excluding pairs of redundant one-word subproducts. Moreover, during the calculation of the partial result, intermediate calculations may be stored in a memory and reused.

In yet another exemplary embodiment, a method of deriving an algorithm for multiplying a first polynomial and a second polynomial over GF(2) is disclosed. The product of a first polynomial and a second polynomial is decomposed into a weighted sum of one-word subproducts. Pairs of redundant one-word subproducts are identified and removed from the weighted sum, resulting in a revised weighted sum having fewer XOR operations. In one particular implementation, the first or second polynomial is padded with zeros so that the polynomial has an even number of words. In this implementation, the zero-padded polynomials may be excluded from the revised weighted sum. In another implementation, the one-word subproducts having weights z of a form $\Sigma_{j=0}^{n-1} z^{i+j}$ for i=0, ..., n−1 are identified. These one-word subproducts can be calculated in a weighted sum by a process of storing and reusing the intermediate calculations.

The disclosed methods may be implemented in a variety of different software and hardware environments. Any of the disclosed methods may be implemented, for example, as a set of computer-executable instructions stored on a computer-readable medium.

These and other features of the disclosed technology are described below with reference to the accompanying figures.

DETAILED DESCRIPTION

Figure 1:
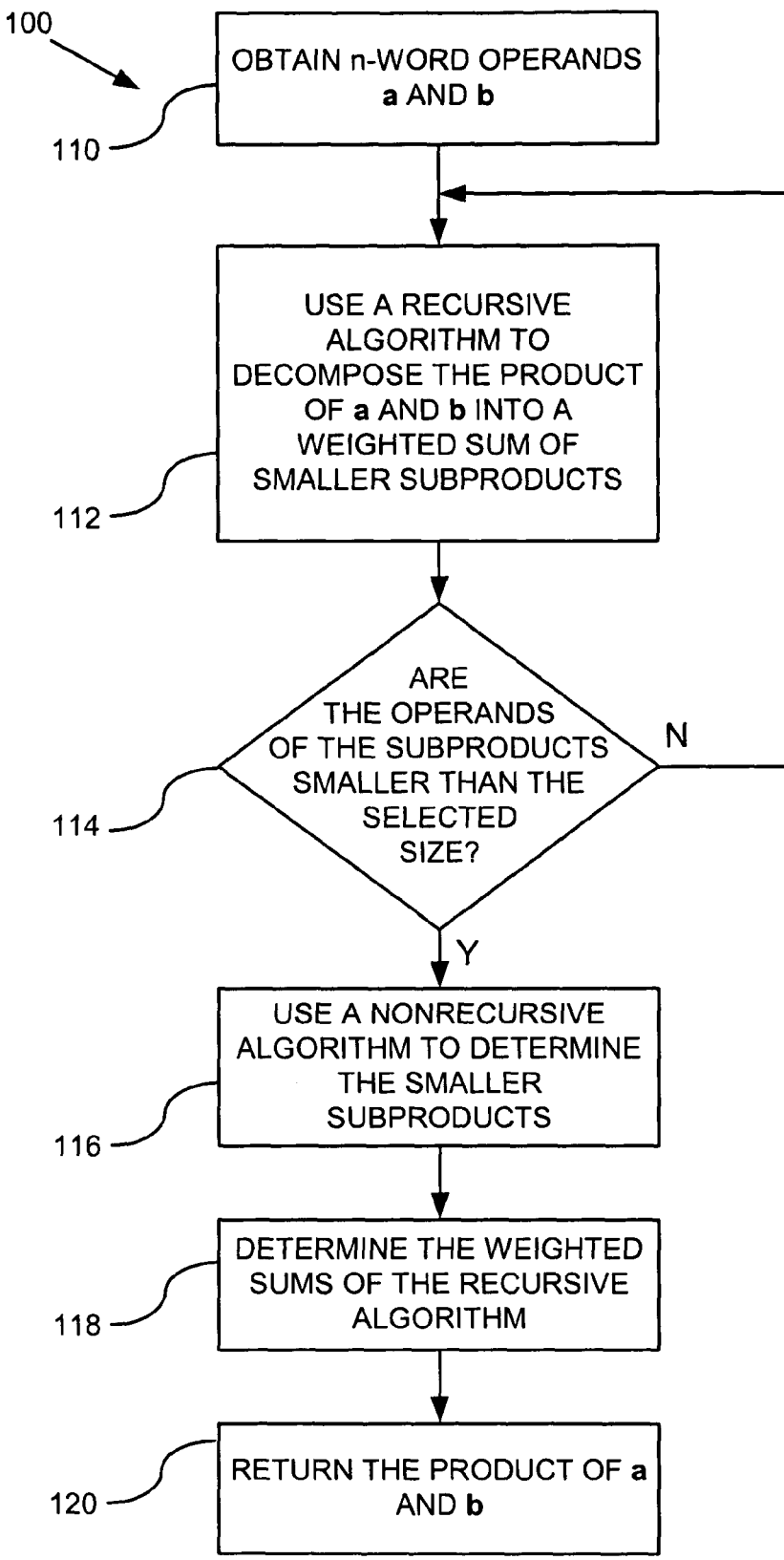
FIG. 1 is a flowchart showing a general method of multiplying multi-precision polynomials over $GF(2^m)$.

Disclosed below are representative embodiments that should not be construed as limiting in any way. Instead, the present disclosure is directed toward novel and nonobvious features and aspects of the various embodiments of the multi-precision multiplication methods and apparatus described below. The disclosed features and aspects can be used alone or in novel and nonobvious combinations and sub-combinations with one another.

Although the operations of the disclosed methods are described in a particular, sequential order for the sake of presentation, it should be understood that this manner of description encompasses minor rearrangements, unless a particular ordering is required. For example, operations described sequentially may in some cases be rearranged or performed concurrently. Moreover, for the sake of simplicity, the disclosed flowcharts typically do not show the various ways in which particular methods can be used in conjunction with other methods. Moreover, for the sake of presentation, the detailed description sometimes uses terms like "determine" and "obtain" to describe the disclosed methods. These terms are high-level abstractions of the actual operations that are performed by a computer or digital circuit. The actual operations that correspond to these terms will vary depending on the particular implementation and are readily discernible by one of ordinary skill in the art.

As more fully described below, the disclosed methods can be implemented in a variety of different environments, including a general-purpose computer, an application-specific computer or in various other environments known in the art. The particular environments discussed, however, should not be construed to limit the scope of use or functionality of the disclosed methods.

General Considerations

The elements in $GF(2^m)$ can be represented in various bases. For purposes of this disclosure, the standard basis representation for $GF(2^m)$ is used. In the standard basis, the field elements are represented as polynomials in the form $a(x)=a_0+a_1x+ \ldots +a_{m-1}x^{m-1}$ where all $a_i$ are elements of $GF(2^m)$. The operations on these elements are performed modulo a fixed irreducible polynomial of degree m. Thus, standard basis multiplication in $GF(2^m)$ has two phases. The first phase consists of multiplying two polynomials over $GF(2^m)$ and the second phase consists of reducing the result modulo an irreducible polynomial of degree m. The complexity of standard polynomial multiplication is $O(m^2)$. Modulo reduction can be an even more time-consuming operation because it involves division.

As seen, both phases of standard basis multiplication in $GF(2^m)$ are quite costly. The cost of the first phase can be decreased by using the Karatsuba-Ofman Algorithm (KOA) to multiply the polynomials over $GF(2^m)$. The KOA is a multiplication algorithm whose asymptotic complexity is $O(m^{1.58})$. Thus, its computational cost is less than the standard $O(m^2)$ multiplication for large m values. The second phase can also be decreased by choosing an irreducible polynomial with a small number of terms. In particular, a trinomial or pentanomial can be used as the irreducible polynomial. A trinomial is a polynomial $1+x^a+x^m$ with only three terms, while a pentanomial is a polynomial $1+x^a+x^b+x^c+x^m$ with only five terms. The complexity of the modulo reduction operation with a trinomial or a pentanomial is $O(m)$. Further, a trinomial or a pentanomial can be found for any field size m<1000.

Combining the KOA and modulo reduction with a trinomial or pentanomial yields a fast multiplication method for $GF(2^m)$. This fast multiplication method works for all field sizes. As more fully discussed below, the first phase of this method (i.e., the phase in which the polynomials over $GF(2^m)$ are multiplied using the KOA) can be improved even further.

Polynomials Over $GF(2^m)$ and Notation

The coefficients of the polynomials over $GF(2^m)$ are 0 or 1 and operations on these coefficients are performed according to modulo two arithmetic. Thus, addition and subtraction of the coefficients is equivalent to performing XOR operations. As a result, the addition and subtraction of two polynomials can be performed by XORing the corresponding coefficients. Note that polynomial multiplication also depends on the XOR addition/subtraction operation because polynomial multiplication involves a series of coefficient additions.

For purposes of this disclosure, bold face variables denote polynomials. Although these polynomials are functions of x, the x argument is omitted for the sake of presentation. Thus, a polynomial denoted by a(x) in the traditional notation will be denoted by a.

Let a be a polynomial over GF(2) of degree m−1 where, $$a = a_0 + a_1 x + \ldots + a_{m-1} x^{m-1}, \quad (1)$$

and where $a_i$'s are binary-valued coefficients. These coefficients are stored as the m-bit sequence $(a_0, a_1, \ldots, a_{m-1})$. These bits are partitioned into several words. Let a word length be w bits and $n = \lceil m/w \rceil$. The m-bit sequence $(a_0, a_1, \ldots, a_{m-1})$ can be extended to the nw-bit sequence $(a_0, a_1, \ldots, a_{m-1}, a_m = 0, a_{m+1} = 0, \ldots, a_{nw-1} = 0)$ by zero padding. The bits are then partitioned into n words such that the ith word contains the bit sequence $a_{iw+j}$ for $j = 0, \ldots, w-1$. Let the polynomial a[i] be defined from the coefficients in the ith word as follows:

$$a[i] = \sum_{j=0}^{w-1} \alpha_{iw+j} x^j. \quad (2)$$

The term a can be expressed in terms of a[i]'s and $z = x^w$ as follows:

$$\begin{aligned} a &= a_0 + a_1 x + \ldots + a_{nw-1} x^{nw-1} \\ &= \sum_{i=0}^{n-1} \sum_{j=0}^{w-1} a_{iw+j} x^{iw+j} \\ &= \sum_{i=0}^{n-1} \left( \sum_{j=0}^{w-1} a_{iw+j} x^j \right) x^{iw} \\ &= \sum_{i=0}^{n-1} a[i] z^i \\ &= a[0] + a[1] z + \ldots + a[n-1] z^{n-1}. \end{aligned} \quad (3)$$

As mentioned before, the coefficients of the polynomial a are stored in n words. Thus, a polynomial a over GF($2^m$) can be viewed as an n-word array. According to this analogy between the polynomials and the arrays, the polynomial a[i] for i=0, . . . , n−1 is the ith word of a and the binary-valued coefficients are bits.

The polynomial a[k #l] can be defined from the words a[i+k] for i=0, . . . ,l−1 as follows:

$$\begin{aligned} a[k \#l] &= \sum_{i=0}^{l-1} a[i+k] z^i \\ &= a[k] + a[k+1] z + \ldots + a[k+l-1] z^{l-1}. \end{aligned} \quad (4)$$

The polynomial a[k #l] can be viewed as a subarray of a. In this subarray notation, k and l are the index and length parameters. The value of k points to the first word of the subarray and shows the position of this word in a, while l gives the length of the subarray in words.

For purposes of this disclosure, the following arithmetic operations on the polynomials over GF($2^m$) are used: (1) polynomial addition; (2) multiplication of a polynomial by powers of z; and (3) polynomial multiplication.

Polynomial Addition Over GF($2^m$)

The addition of the polynomials over GF($2^m$) can be performed by XORing the corresponding words of the arrays in which the polynomials are stored. For example, let a and b be two n-word polynomials. The n-word polynomial t=a+b can be computed as follows:

for i=0 to n−1

$$t[i] := a[i] \text{ XOR } b[i] \quad (5)$$

Polynomial addition is generally simple to implement in software because every general-purpose processor has an instruction to XOR word-size operands such as a[i] and b[i].

Multiplication by Powers of z

Because $z = x^w$, multiplying a polynomial by $z^i$ is equivalent to shifting the words in its array representation up by i positions. Thus, the jth word becomes the (i+j)th word. Because of shifting, the 0th to (i−1)th words are emptied. These words are filled with zeros. For example, let a be an n-word polynomial. The (n+i)-word polynomial $t = a z^i$ can be found as follows:

for j=0 to i, t[j]:=0;

for j=0 to n−1, $$t[i+j] := a[j]. \quad (6)$$

Note that the multiplication by $z^i$ involves array indexing and does not use any computation.

Polynomial Multiplication Over GF($2^m$)

Let a and b be two n-word polynomials. The 2n-word product t=a*b can be computed as follows:

for i=0 to n−1, for j=0 to n−1, (C,S):=MULGF2(a[i],b[j])

t[i+j]:=t[i+j] XOR S $$t[i+j+1] := t[i+j+1] \text{ XOR } C, \quad (7)$$

where MULGF2 multiplies two one-word polynomials, writes the lower word of the result into S, and writes the higher word into C. However, no general-purpose processor contains an instruction to perform the MULGF2 operation. Instead, MULGF2(a[i],b[j]) can be emulated as follows:

C:=0;S:=0 for k=0 to w−1,

S:=SHL(S)

C:=RCL(C)

$$\text{if BIT}(b[j],k) = 1 \text{ then } S := S \text{ XOR } a[i], \quad (8)$$

where SHL shifts its operand by one bit, and RCL is a rotate (circular shift) instruction that shifts its operand circularly to the left by one bit. As seen above, MULGF2 consists of a sequence of shifts and XOR operations because the polynomial multiplication involves a sequence of shifts and additions. In the operation outlined above, for instance, the addition is the bitwise XOR operation.

The Karatsuba-Ofman Algorithm

The Karatsuba-Ofman algorithm (KOA) is a divide-and-conquer technique used to perform large multiplications. For instance, large multiplication may involve the multiplication of multiplicands comprised of a large number of words. In general, the KOA computes a large multiplication using the results of the smaller multiplications. The KOA computes these smaller multiplications using the results of still smaller multiplications. This process continues recursively until the multiplication becomes relatively small (e.g., until the multiplicands are reduced to one word) such that they may be computed directly without any recursion.

As more fully described below, the KOA algorithm may be modified such that the recursions are stopped early and a bottom-level multiplication is performed using some nonrecursive algorithms. These nonrecursive algorithms may be derived from the KOA by removing its recursions. Moreover, the algorithms may be optimized by exploiting the arithmetic of the polynomials over $GF(2^m)$. Consequently, the complexity and recursion overhead can be reduced. For purposes of this disclosure this modified embodiment of the KOA is termed the LKOA, or "lean" implementation of the KOA.

Polynomial Multiplication Over $GF(2^m)$ Using the KOA

Let a be an n-word polynomial. Note that $$n = \lceil \tfrac{n}{2} \rceil + \lfloor \tfrac{n}{2} \rfloor,$$

since n is an integer. The operand a may be split into a $$\lceil \tfrac{n}{2} \rceil$$

-word polynomial $a_L$ and a $$\lfloor \tfrac{n}{2} \rfloor$$

-word polynomial $a_H$ as follows:

$$a_L = a\left[0 \, \# \lceil \tfrac{n}{2} \rceil\right] = \sum_{i=0}^{\lceil \tfrac{n}{2} \rceil - 1} a[i] z^i \qquad (9)$$

$$a_H = a\left[\lceil \tfrac{n}{2} \rceil \, \# \lfloor \tfrac{n}{2} \rfloor\right] = \sum_{i=0}^{\lfloor \tfrac{n}{2} \rfloor - 1} a\left[i + \lceil \tfrac{n}{2} \rceil\right] z^i.$$

Consequently, $a_L$ and $a_H$ are two half-sized polynomials defined from the first $$\lceil \tfrac{n}{2} \rceil$$

and the last $$\lfloor \tfrac{n}{2} \rfloor$$

words of a respectively. Thus, $a_L$ contains the coefficients of the lower-order terms of a, while $a_H$ contains the coefficients of the higher-order terms. The operand a can be represented in terms of these half-sized polynomials in the following manner:

$$a = \sum_{i=0}^{\lceil \tfrac{n}{2} \rceil - 1} a[i] z^i + z^{\lceil \tfrac{n}{2} \rceil} \sum_{i=0}^{\lfloor \tfrac{n}{2} \rfloor - 1} a\left[i + \lceil \tfrac{n}{2} \rceil\right] z^i \qquad (10)$$

$$= a\left[0 \, \# \lceil \tfrac{n}{2} \rceil\right] + z^{\lceil \tfrac{n}{2} \rceil} a\left[\lceil \tfrac{n}{2} \rceil \, \# \lfloor \tfrac{n}{2} \rfloor\right]$$

$$= a_L + a_H z^{\lceil \tfrac{n}{2} \rceil}.$$

Let b be another n-word polynomial. Like a, the operand b can be represented in terms of two half-sized polynomials:

$$b = b_L + b_H z^{\lceil \tfrac{n}{2} \rceil}, \qquad (11)$$

where $$b_L = b\left[0 \, \# \lceil \tfrac{n}{2} \rceil\right] \text{ and } b_H = b\left[\lceil \tfrac{n}{2} \rceil \, \# \lfloor \tfrac{n}{2} \rfloor\right].$$

Then, the product t=ab can be expressed in terms of the four half-sized products $a_L b_L$, $a_L b_H$, $a_H b_L$, and $a_H b_H$ as follows:

$$t = ab \qquad (12)$$

$$= (a_L + a_H z^{\lceil \tfrac{n}{2} \rceil})(b_L + b_H z^{\lceil \tfrac{n}{2} \rceil})$$

$$= a_L b_L + (a_L b_H + a_H b_L) z^{\lceil \tfrac{n}{2} \rceil} + a_H b_H z^{2\lceil \tfrac{n}{2} \rceil}.$$

Because the addition of two polynomials over $GF(2^m)$ is performed by XORing the corresponding coefficients, the equality $a_L b_H + a_H b_L = (a_L + a_H)(b_L + b_H) + a_L b_L + a_H b_H$ is true. By using this equality, the previous equation can be rewritten as:

$$t = a_L b_L + [(a_L + a_H)(b_L + b_H) + a_L b_L + a_H b_H] z^{\lceil \tfrac{n}{2} \rceil} + a_H b_H z^{2\lceil \tfrac{n}{2} \rceil}. \qquad (13)$$

The above equation shows that three multiplications of half-sized polynomials are sufficient to compute t=ab instead of four. First, the products of $a_L b_L$, $(a_L + a_H)(b_L + b_H)$, and $a_H b_H$ are found. Then, the results are multiplied by the appropriate powers of z and added to one another to obtain t=ab. The multiplication by the powers of z can be implemented as array shifts.

The general concept of the KOA is to express a multiplication in terms of three half-sized multiplications, as in Equation (13). Consequently, one multiplication operation can be saved at the expense of performing more additions. Because the complexity of multiplication is quadratic, while the complexity of addition is linear, this substitution is advantageous for large values of n.

As shown in Equation (13), the KOA computes a product from three half-sized products. In this same fashion, the KOA computes each of the half-sized products from three quarter-sized products. This process continues recursively until the products get very small (e.g., until the multiplicands are reduced to one word) and can be computed quickly using classical methods.

The following exemplary recursive function implements the KOA for the polynomials over $GF(2^m)$. The function is provided in the following pseudocode:

```
function: KOA(a, b : n-word polynomial; n : integer)
t : 2n-word number a_L, a_M : ⌈n/2⌉ – word polynomial low, mid : 2⌈n/2⌉ – word polynomial a_H : ⌊n/2⌋ – word polynomial high : 2⌊n/2⌋ – word polynomial begin
Step 1:   if n = 1 then return t := MULGF2(a, b)
          /* Generate 3 pairs of half sized numbers */
Step 2:   a_L := a[0 # ⌈n/2⌉]
Step 3:   b_L := b[0 # ⌈n/2⌉]
Step 4:   a_H := a[⌈n/2⌉ # ⌊n/2⌋]
Step 5:   b_H := b[⌈n/2⌉ # ⌊n/2⌋]
Step 6:   a_M := a_L + a_H
Step 7:   b_M := b_H + b_L
          /* Recursively multiply the half sized numbers */
Step 8:   low := KOA(a_L, b_L, ⌈n/2⌉)
Step 9:   high := KOA(a_H, b_H, ⌊n/2⌋)
Step 10:  mid := KOA(a_M, b_M, ⌈n/2⌉)
          /* Combine the subproducts to obtain the output */
Step 11:  t := low + [mid + low + high] z^⌈n/2⌉ + high z^(2⌈n/2⌉)
          return t
          end
```

In Step 1, n is evaluated. If n is one (i.e., if the inputs are one-word inputs), the inputs are multiplied using classical methods and the result returned. Otherwise, the function continues to the remaining steps. In Steps 2 through 5, two pairs of half-sized polynomials $(a_L, b_L)$ and $(a_H, b_H)$ are generated from the lower- and higher-order words of the inputs. In Steps 6 and 7, another pair, $(a_M, b_M)$, is obtained by adding $a_L$ with $b_L$ and $a_H$ with $b_H$. In Steps 8, 9, and 10, these three pairs are multiplied. These multiplications are performed by three recursive calls to the KOA function and yield the subproducts low, mid, and high.

Finally, t=ab is computed from the subproducts in Step 11, as shown in the Equation (13). These subproducts are low=$a_L b_L$, high=$a_H b_H$, and mid=$a_M b_M$=$(a_L+a_H)(b_L+b_H)$.

The Lean Karatsuba-Ofman Algorithm (LKOA)

The recursion overhead degrades the performance of the KOA. Thus, it is desirable to stop the KOA recursions early and perform the bottom-level multiplications using some nonrecursive method. For this, Step 1 of the KOA function (as outlined above) can be modified. For example, the recursion can be stopped when $n \leq n_0$ where $n_0$ is some predetermined integer. A nonrecursive function can then be called to perform the remaining multiplication.

A variety of different nonrecursive algorithms can be used to multiply the polynomials of size $n \leq n_0$. For example, in one exemplary embodiment, the polynomials are multiplied on a word-by-word basis, as shown above in the section discussing polynomial multiplication over $GF(2^m)$. In another exemplary embodiment, a series of nonrecursive algorithms derived from the KOA can be used. These algorithms are each specific to a fixed input size and multiply 2, 3, ... n-word polynomials respectively. The algorithms may be used in a variety of different combinations and subcombinations with one another. For instance, one particular embodiment uses the 2, 3, 4, 5, and 6-word nonrecursive multiplication algorithms described below in combination with the KOA. The details of the particular algorithms described may be modified in a number of ways (e.g., the sequence in which the various subproducts are computed may be altered) without departing from the scope of the present disclosure.

The following discussion describes one particular implementation in which the KOA function multiplies the polynomials of the size $n \leq n_0 = 6$ without any recursion. In this implementation, Step 1 of the KOA is modified as follows:

```
Step 1:   if n ≤ 6 then
              if n = 1 then return t := MULGF2(a, b) endif
              if n = 2 then return t := KOA2(a, b) endif
              if n = 3 then return t := KOA3(a, b) endif
              if n = 4 then return t := KOA4(a, b) endif
              if n = 5 then return t := KOA5(a, b) endif
              if n = 6 then return t := KOA6(a, b) endif
          endif
```

In this exemplary implementation, KOA2, KOA3, KOA4, KOA5 and KOA6 are the algorithms derived from the KOA. To obtain these algorithms, the recursions of the KOA, as well as the inherent redundancies in the KOA, are removed by exploiting the arithmetic of the polynomials over $GF(2^m)$. As noted above, this type of implementation is termed a lean implementation of the KOA, or LKOA.

The various algorithms—KOA2, KOA3, KOA4, KOA5, and KOA6—are explained below with the benefit of the proceeding recursion tree analysis. Although only five such algorithms are expressly described in this disclosure, the techniques used to derive these algorithms could be used to obtain other algorithms for polynomials of the size n>6. Moreover, the various nonrecursive functions can be used in various other combinations not expressly described herein. For example, the LKOA algorithm described above can be modified such that only products of 4-word polynomials or less are determined using a nonrecursive function.

FIG. 1 is a flowchart 100 showing a general method of implementing the LKOA. At process block 110, two n-word operands a and b are obtained or received. As described above, the operands a and b comprise multiple words of one or more bits and represent a polynomial in $GF(2^m)$. At process block 112, a recursive algorithm is used to decompose the multiplication of a and b into a weighted sum of smaller subproducts. The recursive algorithm utilized may be the KOA or a similar divide-and-conquer algorithm. As shown by process block 114, the decomposition continues until the size of the operands of the subproducts reaches a predetermined size. For example, in the exemplary implementation described above, the recursive algorithm is used to decompose the products until the operands are six words or less. When the operand size is less than the predetermined size, process block 116 shows that a nonrecursive algorithm is used to determine the smaller subproducts. The nonrecursive algorithm used may, for instance, be one of the nonrecursive algorithms described below, or another nonrecursive algorithm that efficiently determines the relevant subproduct. At process block 118, the values of these subproducts are used in the weighted sum of process block 112 to complete the calculation. At process block 120, the final value of the weighted sum is returned.

The following sections describe one particular implementation of the LKOA in greater detail.

Fast $GF(2^m)$ Multiplication Using the LKOA

As mentioned before, two operands in $GF(2^m)$ can be multiplied together in two phases. In the first phase, the $(n=\lceil m/w \rceil)$-word polynomials representing the elements are multiplied and the 2n-word product polynomial obtained. In the second phase, the product polynomial is reduced with an irreducible polynomial of degree m. In this way, an $(n=\lceil m/w \rceil)$-word polynomial representing the multiplication result in $GF(2^m)$ is obtained.

The polynomial multiplication in the first phase may be performed on a word-by-word basis using the straightforward MULGF2 multiplication algorithm described above. According to this method, however, the first phase is quadratic in time (i.e., $O(m^2)$). Alternatively, the LKOA may be used to perform the first phase of polynomial multiplication. Because the LKOA runs in less than quadratic time, even for small values of m, the overall time for multiplication is decreased. The LKOA runs faster than the straightforward multiplication algorithm because it trades multiplications in favor of additions. In particular, the LKOA reduces the number of 1-word multiplications (MULGF2) at the expense of more 1-word additions (XOR). Because the MULGF2 operation is costly to implement, the tradeoff results in a more efficient multiplication algorithm. Indeed, the emulation of MULGF2 takes hundreds of clock cycles for a typical value having a word size w=32. By contrast, the XOR operation is a simple operation that is performed in a single clock cycle in many processors. Table 6, discussed below, shows the number of XOR and MULGF2 operations needed for the KOA, the LKOA, and the straightforward polynomial multiplication. As seen in Table 6, the KOA and the LKOA use fewer MULGF2 operations than the straightforward polynomial multiplication for all $n=\lceil m/w \rceil$.

For many applications, the LKOA can be used to multiply polynomials with no or little recursion. For example, the LKOA can be used in the finite fields $GF(2^m)$ for $163 \leq m \leq 512$, which are used in elliptic curve cryptography. If a word size w=32 is used, for instance, then the polynomials representing the field elements are in the range of 6 to 16 words. When the LKOA multiplies 6-word polynomials, there is no recursion. Thus, in Step 1, the nonrecursive function KOA6 is called for the computation. When the LKOA multiplies 16-word polynomials, only two levels of recursive calls are used. In the first recursion level, the input size is reduced to 8-word polynomials. In the second recursion level, the input size is reduced to 4-word polynomials, and the inputs are multiplied by the nonrecursive function KOA4.

In the second phase of the $GF(2^m)$ multiplication, the result of the polynomial multiplication is reduced with a trinomial or pentanomial of degree m. This computation has a linear time of $O(m)$. The implementation of the reduction with a trinomial or pentanomial, for example, is relatively simple and straightforward. See, e.g., R. Schroeppel et al., *Fast Key Exchange with Elliptic Curve Systems*, Advances in Cryptology—CRYPTO 95, pp. 43-56 (1995).

Recursion Tree Analysis and Terminology

A recursion tree is a diagram that depicts the recursions in an algorithm. Recursion trees can be particularly helpful in the analysis of recursive algorithms like the KOA that may call themselves more than once in a recursion step.

Figure 2:
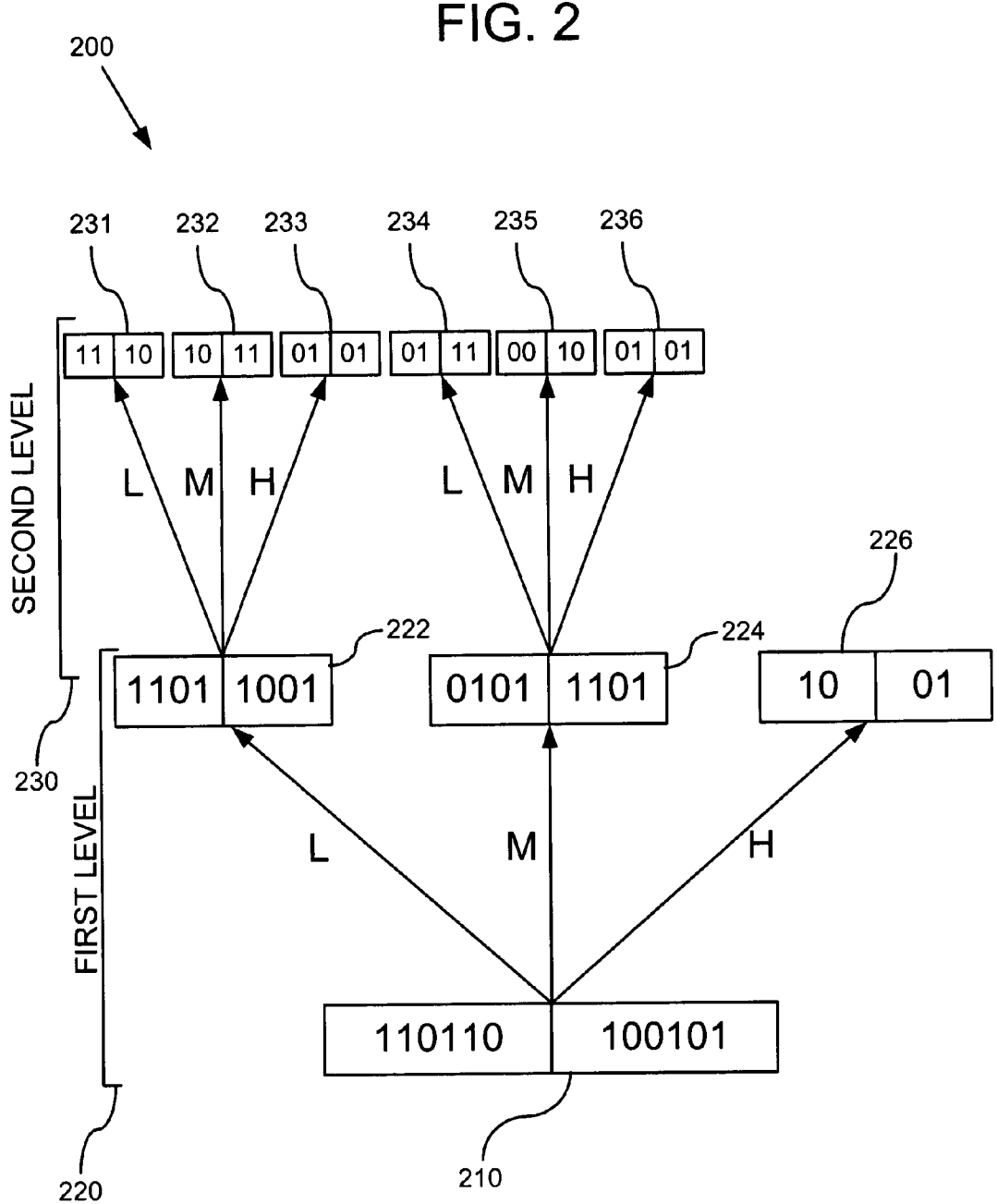
FIG. 2 is a block diagram of an exemplary recursion tree having two levels of recursion.

In its simplest form, the recursion tree of an algorithm can be thought of as a hierarchical tree structure wherein each branch represents a recursive call of the algorithm. FIG. 2 shows an exemplary recursion tree 200 that depicts the multiplication of two exemplary polynomials using an algorithm similar to the KOA. For purposes of the example shown in FIG. 2, assume that the recursion stops when the subproducts reach a size of one word, at which point they can be calculated using classical methods. In the example shown in FIG. 2, the polynomials $1+x+x^3+x^4$ and $1+x^3+x^5$ are multiplied together. In FIG. 2, these polynomials are written as a string of two-bit words (i.e., as three words) showing the binary value of each polynomial's coefficients. Thus, the first polynomial $1+x+x_3^3+x^4$ is denoted as "110110" and the second polynomial $1+x^3+x^5$ is denoted as "100101." The initial call to the algorithm is represented by the root 210 of the tree 200. The recursive calls made by the initial call constitute the first level of recursion 220 and are represented by the first-level branches 222, 224, 226 emerging from the root 210. The recursive calls made by these recursive calls constitute the second level of recursion 230 and are represented in the recursion tree 200 by the second-level branches 231 through 236 emerging from the first-level branches 222, 224. Note that branch 226 does not have any second-level branches stemming from it because branch 226 represents the product of one-word operands and can be calculated using classical methods (e.g., a MULGF2 operation supporting 2-bit words).

A branch emerging from another branch may be called a "child." Similarly, the branch from which the child stems may be called the "parent." In FIG. 2, for instance, branch 231 is the child of branch 222. In the recursion tree, if a branch represents a particular recursive call, its children represents the recursive calls made by that call. In other words, a "caller-callee" relationship in an algorithm corresponds to a "parent-child" relationship in the recursion tree. If a recursive call made at some recursion level doesn't make any recursive call at the next level, the branch representing it in the tree has no further children, and may be called a "leaf."

In the recursion tree depicted in FIG. 2, two recursive calls are made by the branches 222 and 224. Thus, three branches, representing a recursive KOA function, emerge from each of these branches. The leaves 231 through 236 and 226 represent the multiplication of one-word inputs, which do not make any recursive calls because they can be calculated using classical methods. Generally speaking, the size of the input parameters are reduced by half in each successive recursion level in the recursion tree. Thus, it is known that at some level, the branches will have one-word inputs and cease to make any further recursive calls.

Recursive tree terminology may be used to describe the KOA or a similar divide-and-conquer algorithm. For example, if one recursive call invokes another, the first recursive call may be referred to as the parent, and the latter recursive call as the child. Thus, a branch may be used as a synonym for a recursive call, and a leaf as a synonym for a recursive call with one-word inputs. Additionally, a path is defined as a sequence of branches from the root in which each branch is a child of the previous one.

For instance, consider branch 222 in FIG. 2. This branch is a call to the KOA function described above. It has two inputs, "1101" and "1001". From these inputs, the branch 222 generates the half-sized pairs $(a_L, b_L)$, $(a_M, b_M)$ and $(a_H, b_H)$ (or (11,10), (10,11), and (01,01), respectively). Its children take these pairs as inputs, multiply them, and return the subproducts low, mid, and high. Then, at Step 11, the subproducts are combined in a weighted sum to obtain the value of the product of "1101" and "1001."

In the KOA, there are three choices for a branch. A branch either takes the input pair $(a_L, b_L)$ from its parent and returns the subproduct low, takes the input pair $(a_H, b_H)$ and returns the subproduct high, or takes the input pair $(a_M, b_M)$ and returns the subproduct mid. For purposes of this disclosure, these first, second, and third types of branches are called low, high, and mid branches respectively. This classification of the branches is given in Table 1 below.

TABLE 1

The classification of the branches in the tree

| | |
|---|---|
| LOW BRANCH | takes the input pair $(a_L, b_L)$ from its parent returns the subproduct low to its parent |
| HIGH BRANCH | takes the input pair $(a_H, b_H)$ from its parent returns the subproduct high to its parent |
| MID BRANCH | takes the input pair $(a_M, b_M)$ from its parent returns the subproduct mid to its parent |

Decomposition of Products Computed by Branches

Let a branch have the n-word inputs a and b, and the output t. The output is the 2n-word product of the inputs (i.e., t=ab). The branch computes t from the subproducts low, mid, and high as shown in Step 11 of the KOA function described above. Rearranging the terms of the equation in this step, the following equation can be obtained:

$$t = \text{low}\left(1 + z^{\lceil \frac{n}{2} \rceil}\right) + \text{mid}\, z^{\lceil \frac{n}{2} \rceil} + \text{high}\left(z^{\lceil \frac{n}{2} \rceil} + z^{2\lceil \frac{n}{2} \rceil}\right) \quad (14)$$

It can be seen from Equation (14) how the product t is decomposed into the subproducts weighted by the polynomials in z. The sizes of these subproducts can be determined from the variable declarations in the KOA function. Table 2 below gives the sizes and the weights of each subproduct in terms of n. Note that the subproducts are computed by the children and the decomposed product t is computed by the parent. As noted above, n is the input size of this parent branch and the decomposed product t is comprised of 2n words.

Let the product computed by the root be denoted as RootProduct, and the products computed by the leaves be denoted as leaf-products. The product RootProduct can be expressed in terms of the leaf-products. To do so, the products computed by the branches on the paths between the root and the leaves can be recursively decomposed

TABLE 2

The input sizes and weights of subproducts computed by children branches

| | computed subproduct | size | weight |
|---|---|---|---|
| Low Child | low | $2\lceil \frac{n}{2} \rceil$ | $1 + z^{\lceil \frac{n}{2} \rceil}$ |
| Mid Child | mid | $2\lceil \frac{n}{2} \rceil$ | $z^{\lceil \frac{n}{2} \rceil}$ |
| High Child | high | $2\lfloor \frac{n}{2} \rfloor$ | $z^{\lceil \frac{n}{2} \rceil} + z^{2\lceil \frac{n}{2} \rceil}$ | using Equation (14). The decomposition proceeds from Root-Product and continues until the leaf-products are obtained. As shown in the following equation, the result is the weighted sum taken over all the leaf-products:

$$RootProduct = \sum_{\forall i} LeafProduct_i\, Weight_i \quad (15)$$

where $LeafProduct_i$ is a particular leaf-product, and $Weight_i$ is a polynomial in z.

Determining Weights of Leaf-products

The factors of $Weight_i$ in Equation (15) are generated by the recursive decompositions performed along the path between the root and the leaf computing $LeafProduct_i$. These factors are the weights of the subproducts introduced during the decompositions and can be determined by the help of Table 2.

Figure 3:
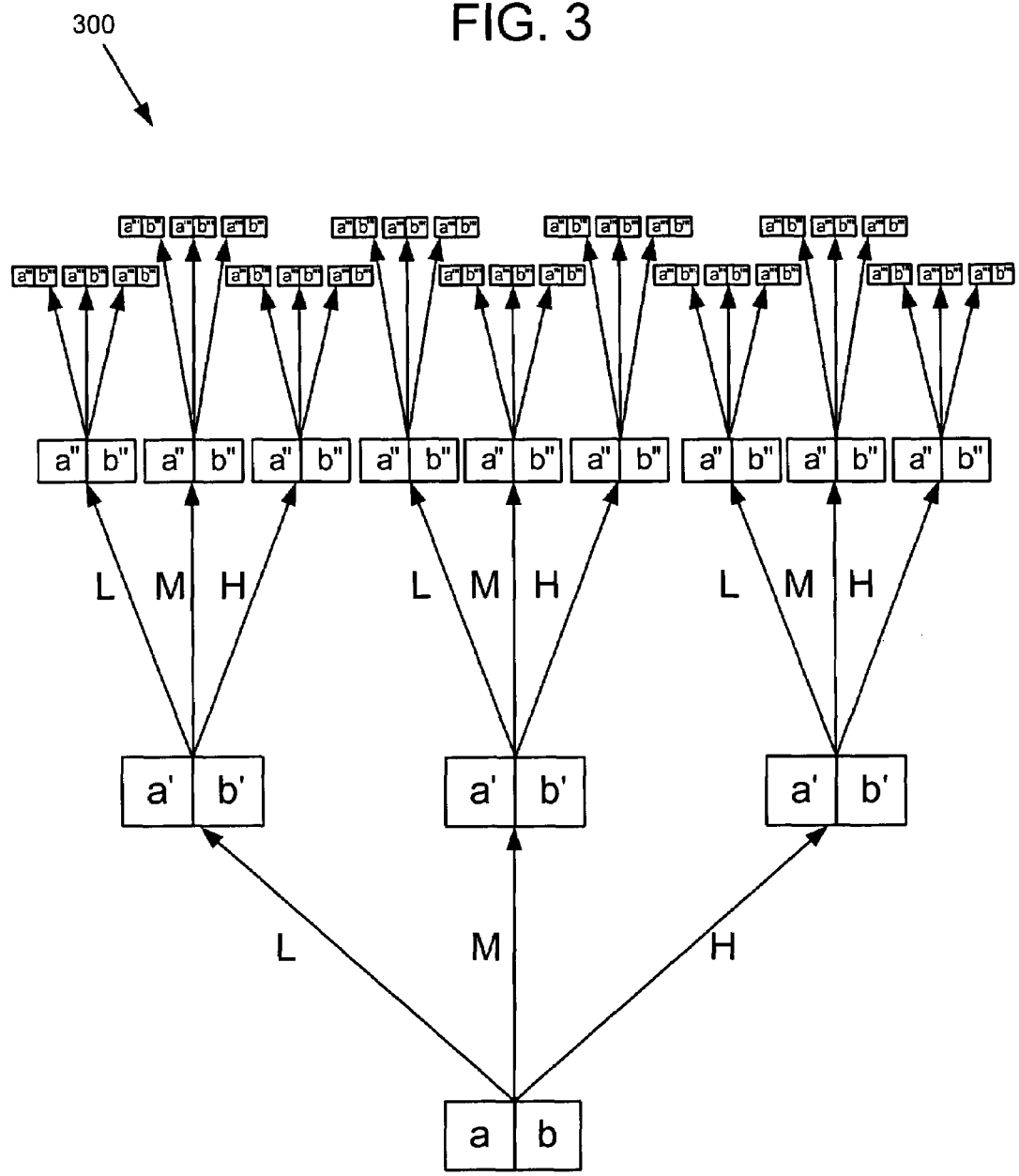
FIG. 3 is a block diagram of an exemplary recursion tree having three levels of recursion.

For example, consider the multiplication of 9-word polynomials using the KOA. Thus, the inputs of the root are 9-word polynomials. FIG. 3 shows a recursion tree 300 illustrating the multiplication of 9-word polynomials a and b. At each level, the polynomials are reduced to smaller subproducts (i.e., a',a'',a''') until the individual subproducts have one-word operands, shown in FIG. 3 at the third recursion level.

Figure 4:
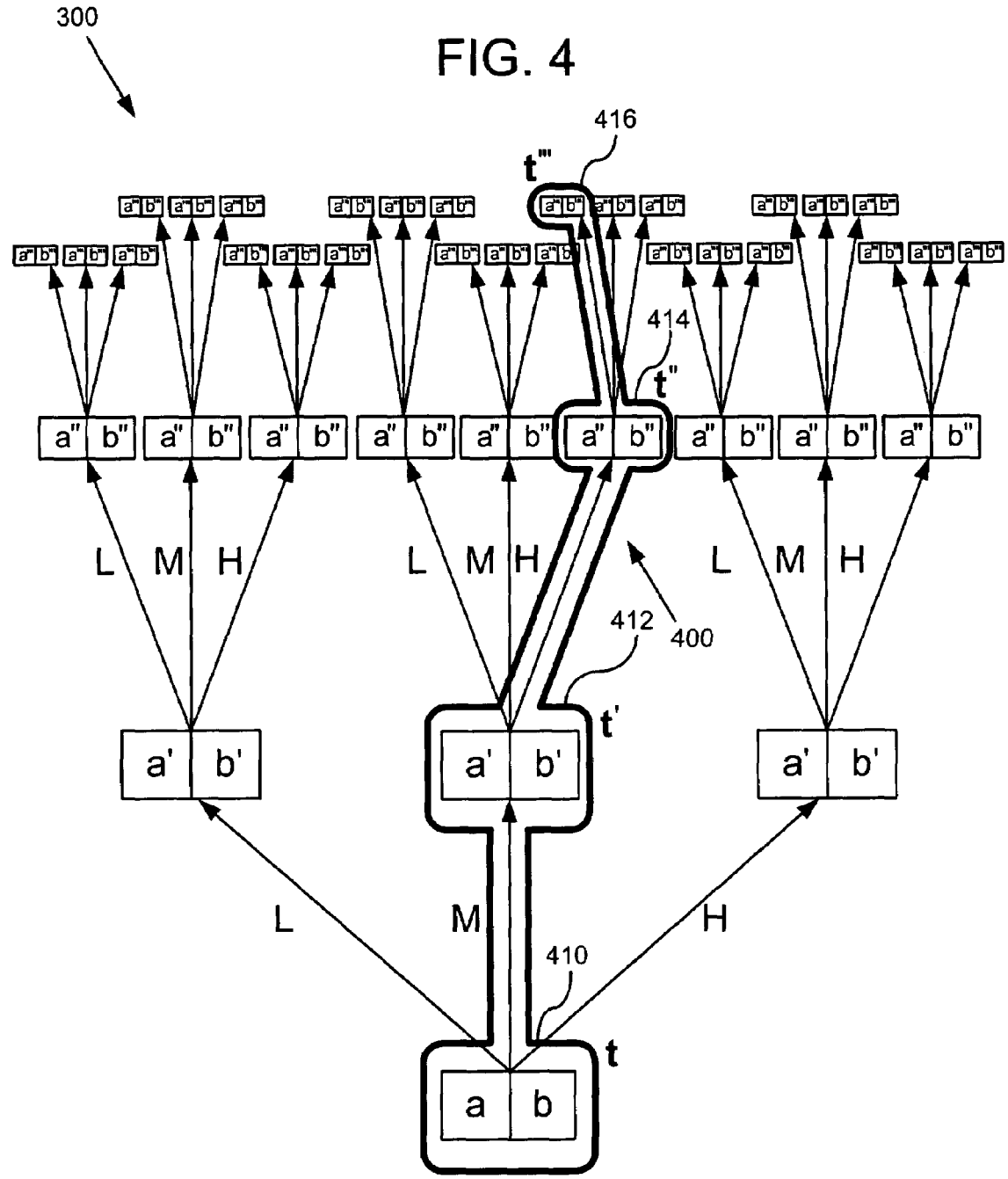
FIG. 4 is a block diagram showing a selected path on the recursion tree of FIG. 3.

Now consider t, t', t'', and t''', respectively, which denote the products computed by the root, its child, its grandchild, and its grandgrandchild along a given path. For purposes of this example, let the child, grandchild, and grandgrandchild be mid, high, and low branches, respectively. FIG. 4 illustrates this path on the recursion tree 300. In particular, path 400 originates at the root 410 (i.e., t), and proceeds to its mid child 412 (t'), then to its high grandchild 414 (t''), and finally to its low grandgrandchild 416 (t'''). The recursive decomposition of the products t, t', and t'' is illustrated in Table 3.

TABLE 3

Example of determining the factors of the weights

| Decomposed product | n | Emerging Subproduct | Decomposition |
|---|---|---|---|
| t | 9 | $2\lceil \frac{n}{2} \rceil$ – word t' | $t = \left[ t'\, z^{\frac{n+1}{2}} + \ldots \right]$ |
| | | | $= t'\, z^5 + \ldots$ |
| 10-word t' | 5 | $2\lfloor \frac{n}{2} \rfloor$ – word t'' | $= \left[ t'' \left( z^{\frac{n+1}{2}} + z^{n+1} \right) + \ldots \right] z^5 + \ldots$ |
| | | | $= t'' \, (z^3 + z^6)\, z^5 + \ldots$ |
| 4-word t'' | 2 | $2\lceil \frac{n}{2} \rceil$ – word t''' | $= \left[ t''' \left( 1 + z^{\frac{n+1}{2}} \right) + \ldots \right] (z^3 + z^6) z^5 + \ldots$ |
| | | | $= t''' \, (1 + z)(z^3 + z^6) z^5 + \ldots$ |
| 2-word t''' | 1 | | |

In Table 3, the decomposed products are given in the first column. The subproducts emerging after the decompositions of these products are given in the third column. The weights and sizes of these subproducts are obtained from Table 2 for the values of n in the second column.

As noted above, n is the input size of the branch computing the decomposed product, and the decomposed product is comprised of 2n words. First, the product t, which is the product computed by the root, is decomposed for n=9. After this decomposition, t' and two other subproducts emerge. In Table 3, only t' is shown. The other subproducts are omitted for the sake of presentation. Remember that t' is computed by a mid branch (the mid child of the root). Its size and weight can be determined from Table 2 for n=9. It is found that t' is comprised of $$2\lceil \frac{n}{2} \rceil = 10$$

words, and its weight is $z^{(n+1)/2} = z^5$. Next, t' is decomposed for n=5. Note that n=5 so that t' has (2n=10) words. In this manner, t'' can also be decomposed. The product t''', however, cannot be decomposed because it has (n=1)-word inputs and is computed at a leaf. Indeed, the leaf-product t''' is computed by direct multiplication having (n=1)-word inputs. The product t in this example corresponds to RootProduct in Equation (14), whereas t''' corresponds to LeafProduct$_i$ for some i. Similarly, Weight$_i$ corresponds to the accumulated weight of t''' (i.e., Weight$_i$=(1+z)(z$^3$+z$^6$)z$^5$).

Determining Leaf-Products

Equation (15) can be useful only if the values of LeafProduct$_i$ are also known. The leaves compute LeafProduct$_i$'s by multiplying their 1-word inputs. Thus, let LeafA and LeafB denote the inputs of the leaf computing LeafProduct$_i$ for some i. Then, LeafProduct$_i$=LeafA LeafB            (16)

To find LeafProduct$_i$, the inputs LeafA and LeafB must be found. The inputs of the leaves and the branches are defined from the inputs of their parent in Steps 2 through 7 of the KOA function. Note that all these inputs are actually derived from the inputs of the root, which is the ancestor of the all the branches and the leaves.

Let RootA and RootB denote the inputs of the root. Also, let a and b denote the inputs of an arbitrary branch. Then, a and b are in the following form:

$$a = \sum_{i=1}^{r} RootA[k_i \# l_i] \quad b = \sum_{i=1}^{r} RootB[k_i \# l_i] \quad (17)$$

for some $r \geq 1$. Thus, a and b are the appropriate subarrays of the root's inputs or the sum of such subarrays. This is because Steps 2 through 7 of the KOA function, where the inputs of the children are generated from the inputs of the parent, involves only two basic operations: (1) partitioning into subarrays; (2) and adding subarrays. Note that in Equation (17), the subarrays which define a and the subarrays which define b have the same the indices and lengths. This results from the fact that the first and second inputs of a branch are generated in the same way, except that the first input is generated from the words of RootA, while the second input is generated from the words of RootB.

Note also that LeafA and LeafB have the following form:

$$LeafA = \sum_{i=1}^{r} RootA[k_i] \quad LeafB = \sum_{i=1}^{r} RootB[k_i] \quad (18)$$

for some $r \geq 1$. This results from the fact that LeafA and LeafB are one-word inputs of a leaf. Thus, the subarrays defining them cannot be longer than one word.

Once the inputs of the leaves are expressed in terms of the root's inputs, as in Equation (18), the leaf-products can be determined as the products of these inputs. As described above, the inputs of a branch are generated from the inputs of its parent. Thus, in order to express the inputs of the leaves in terms of the root's inputs, the inputs of the root's children must first be determined from the inputs of the root. Then, the process can be recursively continued until the inputs of the leaves are obtained.

The relationship between the inputs of the children and the parent is given by the equations in Steps 2 through 7 of the KOA function. The following proposition (Proposition 1) states this relationship in terms of subarray indices and lengths. Remember that the inputs of any branch can be defined by as subarrays of the root's inputs. Thus, the inputs of every branch can be described by some indice and lengths identifying these subarrays.

Table 4, which is referred to in Proposition 1 and provided below, gives the indices and lengths describing the children's inputs in terms of those describing the parent's input. Table 4 can be used recursively to obtain the indices and lengths describing the inputs of the branches from the higher hierarchy to the lower. Eventually, the indices and lengths describing the inputs of the leaves can be found. Then, the inputs of the leaves can be obtained by adding the subarrays identified by these indices and lengths.

Proposition 1: Let the indices and lengths describing the inputs of the parent be $k_i$ and $l_i$ for i=1 ..., r. Then, the indices and lengths describing the children's inputs are as given in Table 4. Note that because some lengths in the table are obtained by subtractions, they can be nonpositive. The subarrays with nonpositive lengths are equal to zero.

In Table 4, $k_i$ and $l_i$ for i=1, ..., r are the indices and lengths, respectively, describing the inputs of the parent. Also, n is the input size of the parent, thus $n=\max(l_1, l_2, \ldots, l_r)$.

TABLE 4

The indices and lengths describing inputs of the children

| inputs | | indices | lengths |
|---|---|---|---|
| Low Child | $a_L, b_L$ | $k_i$ | $\min\left(l_i, \lceil \frac{n}{2} \rceil\right)$ |
| High Child | $a_H, b_H$ | $k_i + \lceil \frac{n}{2} \rceil$ | $l_i - \lceil \frac{n}{2} \rceil$ |
| Mid Child | $a_M, b_M$ | $k_i, k_i + \lceil \frac{n}{2} \rceil$ | $\min\left(l_i, \lceil \frac{n}{2} \rceil\right), l_i - \lceil \frac{n}{2} \rceil$ |

The proof of this proposition proceeds as follows. Consider the branch having the inputs a and b given in Equation (17). Let its low, high, and mid children have the input pairs ($a_L$, $b_L$), ($a_H$, $b_H$), and ($a_M$, $b_M$), respectively. Table 4 suggests that:

$$a_L = \sum_{i=1}^{r} RootA\left[k_i \# \min\left(l_i, \lceil \frac{n}{2} \rceil\right)\right] \quad (19)$$

$$b_L = \sum_{i=1}^{r} RootB\left[k_i \# \min\left(l_i, \lceil \frac{n}{2} \rceil\right)\right]$$

$$a_H = \sum_{i=1}^{r} RootA\left[k_i + \lceil \frac{n}{2} \rceil \# l_i - \lceil \frac{n}{2} \rceil\right]$$

$$b_H = \sum_{i=1}^{r} RootB\left[k_i + \lceil \frac{n}{2} \rceil \# l_i - \lceil \frac{n}{2} \rceil\right]$$

$$a_M = a_L + a_H$$

$$b_M = b_L + b_H,$$

where n is the size of the inputs a and b. The size of a and b is the length of the longest subarray in Equation (17). Thus, $$n = \max(l_1, l_2, \ldots, l_r) \quad (20)$$

Equation (19) can be more particularly explained as follows:

First, as understood from Steps 2 and 3 of KOA function, $a_L$ and $b_L$ are the lower halves of a and b (i.e., the first $\lceil \frac{n}{2} \rceil$ words of a and b). Thus, the subarrays defining $a_L$ and $b_L$ are the lower parts of those defining a and b. The lower part of a subarray is its first $\lceil \frac{n}{2} \rceil$ words or, if it is shorter than $\lceil \frac{n}{2} \rceil$ words, itself. As a result, (1) the subarrays defining $a_L$ and $b_L$ have the same indices as those defining a and b (that is, their indices are equal to $k_i$ for i=1, ..., r, as seen in Equation (19)); and (2) the subarrays defining $a_L$ and $b_L$ cannot be longer than $\lceil \frac{n}{2} \rceil$ words and those defining a and b (that is, their lengths are equal to $\min\left(l_i, \lceil \frac{n}{2} \rceil\right)$ for i=1, ..., r, as seen in Equation (19)).

Second, as understood from Steps 4 and 5 of the KOA function, $a_H$ and $b_H$ are the higher halves of a and b (i.e., the remaining parts of a and b after their first $\lceil \frac{n}{2} \rceil$ words are taken away). Thus, the subarrays defining $a_H$ and $b_H$ are the higher parts of those defining a and b. The higher part of a subarray is its words from the $\lceil \frac{n}{2} \rceil$ th word through the last word or, if it is shorter than $\lceil \frac{n}{2} \rceil$ words, void. As a result, (1) the subarrays defining $a_H$ and $b_H$ have indices $\lceil \frac{n}{2} \rceil$ words larger than those defining a and b (that is, their indices are equal to $k_i + \lceil \frac{n}{2} \rceil$ for i=1, ..., r, as seen in Equation (19)); and (2) the subarrays defining $a_L$ and $b_L$ are $\lceil \frac{n}{2} \rceil$ words shorter than those defining a and b (that is, their lengths are equal to $l_i - \lceil \frac{n}{2} \rceil$ for i=1, ..., r, as seen in Equation (19)). Note that these lengths can be nonpositive due to the subtraction. If a length is nonpositive, the corresponding subarray equals to zero. Third, as seen in Steps 6 and 7 of KOA function, $a_M (b_M)$ is the sum of the $a_L$ and $a_H$ ($b_L$ and $b_H$).

The following example illustrates how the inputs of a leaf are found. First, reconsider the example illustrated in Table 3 and in FIG. 4. In that example, a path was chosen and the products computed by the branches on the path recursively decomposed. Let (a, b), (a', b'), (a", b"), and (a''', b'''), respectively, denote the inputs of the root, its child, its grandchild, and its grandgrandchild on this path. The following table illustrates how the indices and the lengths describing these inputs are found.

considered. The root's inputs (a,b) are the subarrays of themselves (i.e., a=a[0#9] and b=b[0#9]). Thus, the index and length describing the root's inputs (a,b) are 0 and 9, respectively. The next successor on the path is the mid child of the root with the inputs (a', b'). Because this successor is a mid branch, its indices and lengths are $k_i, k_i + \lceil \frac{n}{2} \rceil$ and $\min(l_i, \lceil \frac{n}{2} \rceil), l_i - \lceil \frac{n}{2} \rceil$, respectively, according to Table 4. After the substitutions $k_i = k_1 = 0$, $l_i = l_1 = 9$, and n=9, the indices and lengths describing the inputs of the root's child (a', b') are found. These indices and lengths are $k_1, k_2 = 0, 5$ and $l_1, l_2 = 5, 4$, as seen in Table 5. The size of the inputs (a', b') is the new n value, and n=max($l_1$, $l_2$)=max(5, 4)=5. In this fashion, the indices and lengths describing the inputs (a", b") and (a''', b''') are found. The inputs (a''', b''') comprise (n=1) word. Thus, they are the inputs of the leaf at the end of the path. The indices and lengths describing them are $k_1, k_2 = 3, 8$ and $l_1, l_2 = 1, 1$, as seen in Table 5. This means that a'''=a[3]+a[8] and b'''=b[3]+b[8]. Remember that t''' denotes the product computed by the leaf at the end of the path and is the product of the leaf's inputs. Thus, $$t''' = a''' * b''' = (a[k_1 \ \#l_1] + a[k_2 \ \#l_2])(b[k_1 \ \#l_1] + b[k_2 \ \#l_2]) \quad (21)$$
$$= (a[3] + a[8])(b[3] + b[8])$$

In this manner, the leaf-product t''' can be expressed in terms of the root's inputs.

Nonrecursive Functions Derived from KOA

In this section, exemplary nonrecursive functions KOA2, KOA3, KOA4, KOA5 and KOA6, which multiply 2, 3, 4, 5 and 6-word polynomials respectively, are derived and described. The input size of the functions is derived by analyzing the recursion tree of the KOA.

Consider two multi-word polynomials that are being multiplied by the KOA. In the recursion tree, these polynomials

TABLE 5

Example of determining the indices and the lengths describing the inputs of the branches

| | | | | the successor on the path | |
|---|---|---|---|---|---|
| inputs | n | indices | lengths | indices | lengths |
| (a, b) | 9 | $k_1 = 0$ | $l_1 = 9$ | $k_i, k_i + \lceil \frac{n}{2} \rceil$ | $\min(l_i, \lceil \frac{n}{2} \rceil), l_i - \lceil \frac{n}{2} \rceil$ |
| (a', b') | 5 | $k_1, k_2 = 0, 5$ | $l_1, l_2 = 5, 4$ | $k_i + \lceil \frac{n}{2} \rceil$ | $l_i - \lceil \frac{n}{2} \rceil$ |
| (a", b") | 2 | $k_1, k_2 = 3, 8$ | $l_1, l_2 = 2, 1$ | $k_i$ | $\min(l_i, \lceil \frac{n}{2} \rceil)$ |
| (a''', b''') | 1 | $k_1, k_2 = 3, 8$ | $l_1, l_2 = 1, 1$ | | |

The inputs are given in the first column, the sizes of the inputs are given in the second column, and the indices and lengths describing the inputs are given in the third and fourth columns. For this example, a root with a 9-word input is correspond to the inputs of the root. The root computes their multiplication, benefiting from the computations performed by the other branches (recursive calls). Note that this multiplication, computed by the root, can be expressed as a weighted sum of the leaf-products, as shown in Equation (15). Then, the multiplication of the input polynomials can be performed by computing the weighted sum in Equation (15) without any recursion.

The leaf-products and their weights are needed to compute the weighted sum in Equation (15). As described above, these parameters can be determined from the root's inputs. As noted, the root's inputs are the multi-word polynomials that are being multiplied. If the size and the words of these inputs are known, the leaf-products and their weights can be obtained through Table 2 and Table 4 in the manner illustrated above in the section concerning recursion trees. A computer program, such as a Maple program, can also be used to perform this process.

For many input sizes, the weighted sum in Equation (15) is in a particular form, described below, or can be transformed into this particular form through algebraic substitutions. The following proposition and its corollary introduce this form and show how the weighted sums in this form can be computed efficiently.

Proposition 2: Let $lp_i$ and $w_i$ for $i=0,1,\ldots,n-1$ denote a set of leaf-products and their weights respectively such that, $$w_i = \sum_{j=0}^{n-1} z^{i+j}, \text{ for } i = 0, 1, \ldots, n-1. \tag{22}$$

Consequently, $$t = \sum_{i=0}^{n-1} lp_i w_i$$

is a 2n-word polynomial and can be computed from the leaf-products in the following two steps:

1. Compute the (n+1)-word polynomial h from the words of $lp_i$'s as follows:

$h[0]=lp_0[0]$, $h[i]=lp_i[0]+lp_{i-1}[1]$, for $i=1,\ldots,n-1$, $h[n]=lp_{n-1}[1]$. (23)

2. Compute the words of t from the words of h as follows:

$t[i]=h[i], i=0$, $t[i]=t[i-1]+h[i], 0<i \leq n-1$, $t[i]=h[i-n+1], i=2n-1$, $t[i]=t[i+1]+h[i-n+1], n \leq i < 2n-1$. (24)

The proof of this proposition proceeds as follows. As mentioned before, leaf-products are two-word polynomials. Thus, $$\sum_{i=0}^{n-1} lp_i z^i$$

can be written as:

$$\sum_{i=0}^{n-1} lp_i z^i = \sum_{i=0}^{n-1} (lp_i[0] + lp_i[1]z)z^i \tag{25}$$

$$= lp_0[0] + \sum_{i=0}^{n-1} (lp_i[0] + lp_{i-1}[1])z^i + lp_{n-1}[1]z^n$$

The coefficient of $z^i$ above is equal to h[i] given in Equation (23) for $i=0,\ldots,n$. Thus, the binary polynomial above is h. In brief, $$\sum_{i=0}^{n-1} lp_i z^i = h = \sum_{i=0}^{n} h[i]z^i.$$

Then, $$t = \sum_{i=0}^{n-1} lp_i w_i \tag{26}$$

$$= \sum_{i=0}^{n-1} lp_i \sum_{j=0}^{n-1} z^{i+j} = \sum_{j=0}^{n-1} \sum_{i=0}^{n-1} lp_i z^{i+j}$$

$$= \sum_{j=0}^{n-1} \sum_{i=0}^{n} h[i]z^{i+j}.$$

Because $z^{i_{min}+i_{max}}=z^{2n-1}$, t is a 2n-word polynomial. By using the change of variables $k=i+j$ and $l=i$, the following can be obtained:

$$t = \sum_{k=i_{min}+j_{min}}^{i_{max}+j_{max}} \sum_{l=\max(i_{min},k-j_{max})}^{\min(k-j_{min},i_{max})} h[l]z^k \tag{27}$$

where $i_{min}, j_{min}, i_{max}, j_{max}$ are the minimum and maximum values of i and j variables. Because $i_{min}=0, j_{min}=0, i_{max}=n, j_{max}=n-1$, $$t = \sum_{k=0}^{2n-1} \sum_{l=\max(0,k-n+1)}^{\min(k,n)} h(l)z^k. \tag{28}$$

Note that t[k], the kth word of t, is the coefficient of the term $z^k$ above. Then, $$t[k] = \sum_{l=\max(0,k-n+1)}^{\min(k,n)} h(l), \text{ for } 0 \leq k \leq 2n-1, \tag{29}$$

or equivalently, $$t[k] = \sum_{l=0}^{k} h[l], \quad \text{for } 0 \le k \le n-1, \qquad (30)$$

$$t[k] = \sum_{l=k-n+1}^{n} h[l], \quad \text{for } n \le k \le 2n-1.$$

We can rewrite the equations above as follows:

$$t[k] = h[k] + \sum_{l=0}^{k-1} h[l], \quad \text{for } 0 \le k \le n-1, \text{ and} \qquad (31)$$

$$t[k] = h[k-n+1] + \sum_{l=k-n+2}^{n} h[l], \quad \text{for } n \le k \le 2n-1.$$

For k=i, l=j, the equations above yields the difference equations in Equation (24).

Corollary: Let $lp_i$ and $w_i$ for i=0,1,...,n−m−1 denote a set of leaf-products and their weights respectively such that, $$w_i = z^m \sum_{j=0}^{n-m-1} z^{i+j}, \text{ for } i = 0, 1, \ldots, n-m-1 \qquad (32)$$

Then, $$t = \sum_{i=0}^{n-m-1} lp_i w_i$$

is a (2n−m)-word polynomial and can be computed from the leaf-products in the following two steps:

1. Compute the (n−m+1)-word polynomial h from the words of $lp_i$'s as follows:

$h[0]=lp_0[0]$, $h[i]=lp_i[0]+lp_{i-1}[1]$, for i=1,...,n−m−1, and $h[n-m]=lp_{n-m-1}[1]$. (33)

2. Compute the words of t from the words of h as follows:

$t[i]=0$, $0 \le i < m$, $t[i]=h[i-m]$, $i=m$, $t[i]=t[i-1]+h[i-m]$, $m < i \le n-1$, $t[i]=h[i-n+1]$, $i=2n-m-1$, $t[i]=t[i+1]+h[i-n+1]$, $n \le i < 2n-m-1$. (34)

The proof of the corollary proceeds as follows. The weighted sum $$\sum_{i=0}^{n-m-1} lp_i w_i$$

can be written as:

$$\sum_{i=0}^{n-m-1} lp_i w_i = z^m \sum_{i=0}^{n-m-1} lp_i w_i',$$

where $$w_i' = \sum_{j=0}^{n-m-1} z^{i+j}$$

for i=0,1,...,n−m−1. The $w_i'$ terms are in the form given in Equation (22), except that n−m is substituted for n. Thus, the weighted sum $$\sum_{i=0}^{n-m-1} lp_i w_i'$$

can be computed as shown in Proposition 2. However, n−m must be substituted for n in the equations given in this proposition. After these substitutions, Equation (23) becomes Equation (33), and Equation (24) becomes $t[i]=h[i]$, i=0, $t[i]=t[i-1]+h[i]$, $0 < i \le n-m-1$, $t[i]=h[i-n+m+1]$, $i=2n-2m-1$, $t[i]=t[i+1]+h[i-n+m+1]$, $n-m \le i < 2n-2m-1$. (35)

The above equation provides that $$t = \sum_{i=0}^{n-m-1} lp_i w_i'.$$

However, the desired equation is $$t = \sum_{i=0}^{n-m-1} lp_i w_i'.$$

Thus, t must be multiplied by $z^m$ to obtain the final result. For this, the index of every word of t is increased by m in the above equation. That is, t[index] is replaced with t[index+m]. This shift in the array representation is the equivalent of multiplying by $z^m$. Also, zeros are inserted into the first m word. After the change of variable i=i+m and some rearrangement, Equation (34) can be obtained.

Figure 5:
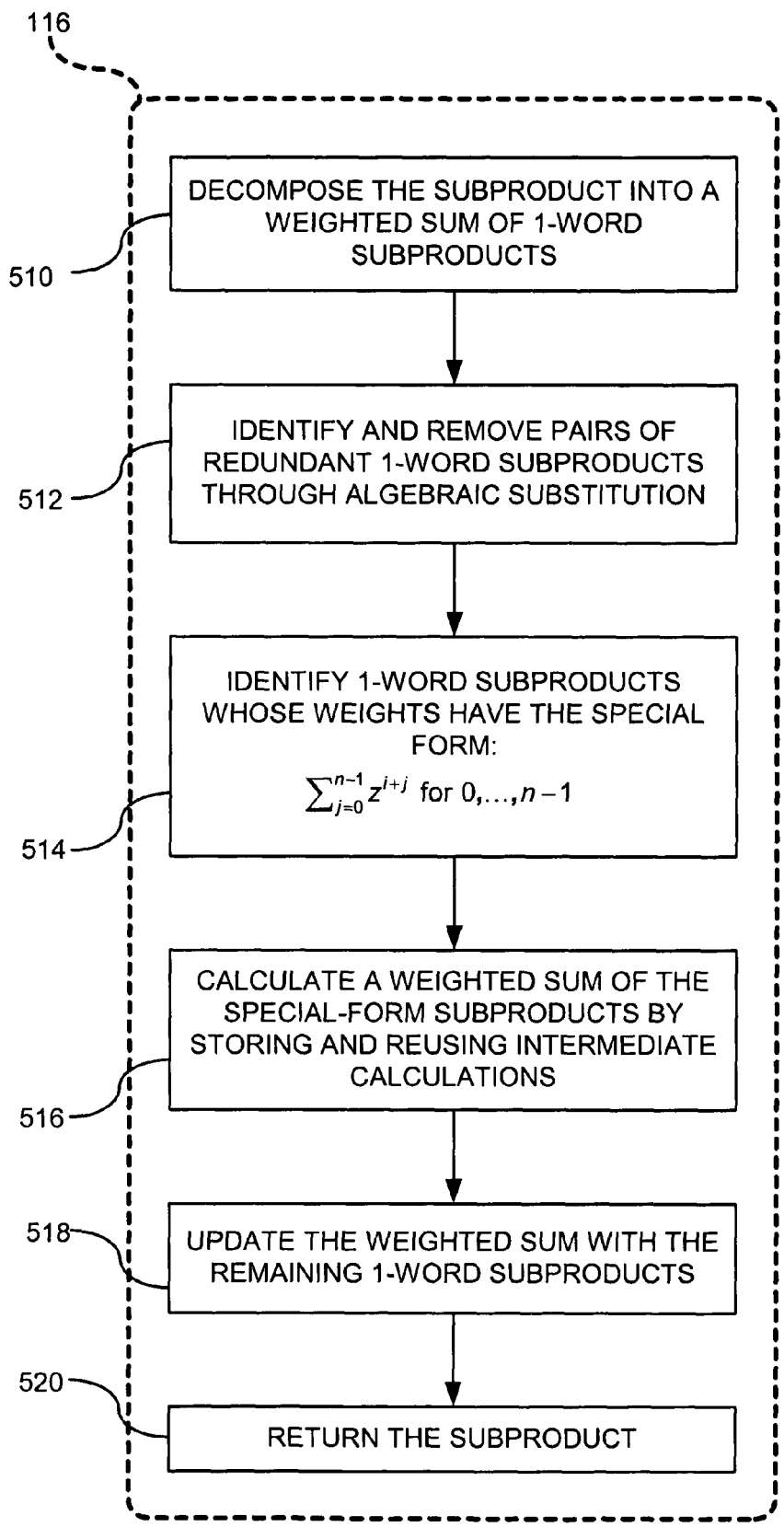
FIG. 5 is a flowchart showing a general method of nonrecursively multiplying multi-precision polynomials over $GF(2^m)$.

FIG. 5 is a flowchart showing generally how the nonrecursive algorithms operate. As shown by the dashed lines, the flowchart of FIG. 5 corresponds generally to process block 116 of FIG. 1.

At process block 510, the subproduct to be calculated is decomposed into a weighted sum of subproducts having one-word inputs. This decomposition may proceed, for instance, in the manner described above for finding the value and respective weights of the leaf-products from the corresponding recursion tree. At process block 512, algebraic substitutions are performed to identify pairs of identical subproducts. These redundant subproducts are then removed from the weighted sum. The pairs of redundant subproducts can be removed because their sum is zero in $GF(2^m)$, thereby reducing the number of XOR operations that need to be performed to obtain the relevant subproduct. At process block 514, subproducts having the form described above in Proposition 2 are identified and grouped so that they can be efficiently calculated using the described method. At process block 516, a weighted sum according to Proposition 2 is calculated, thereby producing a partial result of the subproduct. As shown in Equation (24), this weighted sum can be obtained using previously calculated intermediate values (e.g., t[i−1] and t[i+1]), which may be stored once they are calculated. This procedure of storing and reusing intermediate values also reduces the number of XOR operations that need to be performed in order to obtain the desired product. At process block 518, the remaining subproducts having one-word inputs are calculated and used to update the partial result. The updated partial result produces the final product, which is returned at process block 520.

Although FIG. 5 shows a particular ordering of the processes, the order may vary from embodiment to embodiment. Moreover, the actual implementation of the procedure shown in FIG. 5 may only perform certain ones of the processes. For instance, the actual implementation may comprise code that has already taken into account the pairs of redundant subproducts and removed them from the calculation. Similarly, the subproducts having the special form may already be identified such that the first step performed by the implementation is the calculation of the weighted sum of the subproducts. Further, in certain other implementations, the intermediate values are not stored, but are recalculated.

Exemplary nonrecursive algorithms that may be used to calculate subproducts having 2-6-word operands are described below.

Function KOA2

Let a and b be 2-word polynomials, and their product be t=ab. The product t can be decomposed into the leaf-products, as described above. These leaf-products and their weights are:

| i | Leaf-Products ($lp_i$) | Weights ($w_i$) |
|---|---|---|
| 0 | a[0] b[0] | $1 + z$ |
| 1 | a[1] b[1] | $z + z^2$ |
| 2 | (a[0] + a[1]) (b[0] + b[1]) | $z$ |

Each row above is indexed with i. The ith row contains the ith leaf-product denoted by $lp_i$, and its weight is denoted by $w_i$.

The product t can be computed as the weighted sum of the leaf-products as in the Equation (15):

$$t = ab = \sum_{i=0}^{2} lp_i w_i, \quad (36)$$

The first two weights can be written as $$\sum_{j=0}^{n-1} z^{i+j}$$

for i=0, . . . , n−1 where n=2. These weights are in the form mentioned in Proposition 2. Thus, the weighted sum of the first two leaf-products $lp_0$ and $lp_1$ can be computed efficiently, as described in the proposition. But, this weighted sum is only a partial result for t. To obtain t, this partial result must be added to the weighted sum of the remaining leaf-products in the list above (i.e., to (a[0]+a[1]) (b[0]+b[1]) z).

The function below performs the multiplication of 2-word polynomials by computing the weighted sum of the leaf-products.

---

Inputs: a, b: 2-word polynomials
Output: t: 4-word polynomial
Temporary: $lp_i$: 2-word polynomials
/* Compute the first two leaf-products */
    $lp_i$ := MULGF2(a[i], b[i])    i = 0, 1
/* Compute h from (23) for n = 2 */
    h[0] := $lp_0$[0]
    h[1] := $lp_1$[0] + $lp_0$[1]
    h[2] := $lp_1$[1]
/* Compute the partial result from (24) for n = 2 */
    t[0] := h[0]
    t[1] := t[0] + h[1]
    t[3] := h[2]
    t[2] := t[3] + h[1]
/* Compute the remaining leaf-products */
    $lp_3$:= MULGF2(a[0] + a[1], b[0] + b[1])
/* Update t with the weighted sum of the remaining leaf-products */
    t[1] := t[1] + $lp_3$[0]
    t[2] := t[2] + $lp_3$[1]

---

The function above needs 7 word-additions (XOR) and 3 word-multiplications (MULGF2).

Function KOA3

Let a and b be 3-word polynomials, and their product be t=ab. The product t can be decomposed into the leaf-products, as described above. As a result of this decomposition, the following leaf-products and weights are obtained:

| i | Leaf-Products ($lp_i$) | Weights ($w_i$) |
|---|---|---|
| 0 | a[0] b[0] | $1 + z + z^2 + z^3$ |
| 1 | a[1] b[1] | $z + z^2 + z^3 + z^4$ |
| 2 | a[1] b[1] | $z^3 + z^4$ |
| 3 | a[2] b[2] | $z^2 + z^4$ |
| 4 | (a[0] + a[1]) (b[0] + b[1]) | $z + z^3$ |
| 5 | (a[0] + a[2]) (b[0] + b[2]) | $z^2 + z^3$ |
| 6 | (a[0] + a[1] + a[2]) (a[0] + b[1] + b[2]) | $z^3$ |

Each row above is indexed with i. The ith row contains the ith leaf-product denoted by $lp_i$, and its weight denoted by $w_i$. Note that two of the leaf-products are redundantly the same.

The value of t can be computed as the weighted sum of the leaf-products as in (15).

$$t = ab = \sum_{i=0}^{6} lp_i \cdot w_i \qquad (37)$$

But this does not provide any advantage in terms of computational complexity. Thus, the value of t can be expressed with a modified set of leaf-products and weights so that an efficient scheme for computing the weighted sum can be found. For this purpose, the following substitutions can be made for $lp_6 = (a[0]+a[1]+a[2])(b[0]+b[1]+b[2])$:

$$\begin{aligned}(a[0]+a[1]+a[2])\\(b[0]+b[1]+b[2])\end{aligned} = (a[0]+a[1])(b[0]+b[1]) + a[0]b[0] + \qquad (38)$$
$$(a[0]+a[2])(b[0]+b[2]) + a[1]b[1] +$$
$$(a[1]+a[2])(b[1]+b[2]) + a[2]b[2]$$

The equality above always holds for arbitrary polynomials over $GF(2^m)$ like a[0], a[1], a[2], b[0], b[1], b[2]. After the substitution, the result is again a weighted sum. Every distinct product in the result is defined as a leaf-product. Let $lp_i'$ denote a particular one of them. This product can appear more than once in the result with different weights. These different weights can be added into a single weight and denoted by $w_i'$:

| i | Leaf-Products ($lp'_i$) | Weights ($w'_i$) |
|---|---|---|
| 0 | a[0] b[0] | $1 + z + z^2$ |
| 1 | a[1] b[1] | $z + z^2 + z^3$ |
| 2 | a[2] b[2] | $z^2 + z^3 + z^4$ |
| 3 | (a[0] + a[1]) (b[0] + b[1]) | $z$ |
| 4 | (a[0] + a[2]) (b[0] + b[2]) | $z^2$ |
| 5 | (a[1] + a[2]) (b[1] + b[2]) | $z^3$ |

As before, each row above contains a leaf-product and its weight, and the corresponding weighted sum gives t:

$$t = ab = \sum_{i=0}^{5} lp_i \cdot w_i \qquad (39)$$

The weighted sum of the first three leaf-products in the list above can be written as follows:

$$a[0]b[0](1+z+z^2)+a[1]b[1](z+z^2+z^3)+a[2]b[2](z^2+z^3+z^4) \qquad (40)$$

The weights above can be written as $$\sum_{j=0}^{n-1} z^{i+j}$$

for i=0, ..., n−1 where n=3. These weights are in the form mentioned in Proposition 2, allowing the weighted sum of the first three leaf-products to be computed efficiently as described in the proposition. But, this weighted sum is a partial result for t. To obtain t, this partial result must be added to the weighted sum of the remaining leaf-products in the list above. This weighted sum is:

$$(a[0]+a[1])(b[0]+b[1])z+(a[0]+a[2])(b[0]+b[2])z^2 + (a[1]+a[2])(b[1]+b[2])z^3 \qquad (41)$$

The function below performs the multiplication of 3-word polynomials by computing the weighted sum of the leaf-products:

Inputs: a, b: 3-word polynomials
Output: t: 6-word polynomial
Temporary: $lp_i$: 2-word polynomials
/* Compute the first three leaf-products */
   $lp_i$ := MULGF2(a[i], b[i])                    i = 0, ..., 2
/* Compute h from (23) for n = 3 */
   h[0] := $lp_0$[0]
   h[i] := $lp_i$[0] + $lp_{i-1}$[1]              i = 1, ..., 2
   h[3] := $lp_2$[1]
/* Compute the partial result from (24) for n = 3 */
   t[0] := h[0]
   t[i] := t[i − 1] + h[i]                         i = 1, 2
   t[5] := h[3]
   t[i] := t[i + 1] + h[i − 2]                     i = 4, 3
/* Compute the remaining leaf-products */
   $lp_3$ := MULGF2(a[0] + a[1], b[0] + b[1])
   $lp_4$ := MULGF2(a[1] + a[2], b[1] + b[2])
   $lp_5$ := MULGF2(a[0] + a[2], b[0] + b[2])
/* Update t with the weighted sum of the remaining leaf-products in (41) */
   t[1] := t[1] + $lp_3$[0]
   t[2] := t[2] + $lp_3$[1] + $lp_5$[0]
   t[3] := t[3] + $lp_5$[0] + $lp_5$[1]
   t[4] := t[4] + $lp_4$[1]

The function above needs 18 word-additions (XOR) and 6 word-multiplications (MULGF2).

Function KOA4

Let a and b be 4-word polynomials, and their product be t=ab. The product t can be decomposed into the leaf-products, as described above. These leaf-products and their weights are given below:

| i | Leaf-Products ($lp_i$) | Weights ($w_i$) |
|---|---|---|
| 0 | a[0] b[0] | $1 + z + z^2 + z^3$ |
| 1 | a[1] b[1] | $z + z^2 + z^3 + z^4$ |
| 2 | a[2] b[2] | $z^2 + z^3 + z^4 + z^5$ |
| 3 | a[3] b[3] | $z^3 + z^4 + z^5 + z^6$ |
| 4 | (a[0] + a[2]) (b[0] + b[2]) | $z^2 + z^3$ |
| 5 | (a[1] + a[3]) (b[1] + b[3]) | $z^3 + z^4$ |
| 6 | (a[0] + a[1]) (b[0] + b[1]) | $z^2 + z^4$ |
| 7 | (a[2] + a[3]) (b[2] + b[3]) | $z^3 + z^5$ |
| 8 | (a[0] + a[1] + a[2] + a[3]) (b[0] + b[1] + b[2] + b[3]) | $z^4$ |

Each row above is indexed with i. The ith row contains the ith leaf-product denoted by $lp_i$ and its weight denoted by $w_i$.

The value of t can be computed as the weighted sum of the leaf-products as in Equation (15).

$$t = ab = \sum_{i=0}^{8} lp_i \omega_i \qquad (42)$$

The first four weights can be written as $$\sum_{j=0}^{n-1} z^{i+j}$$

for i=0, . . . , n−1 where n=4. Also, the fourth and the fifth weights can be written as $$z^m \sum_{j=0}^{n-m-1} z^{i+j}$$

for i=0, . . . , n−m−1 where n=4 and m=2. These weights are in the forms mentioned in Proposition 2. Thus, the weighted sum of the first six leaf-products $lp_0$, $lp_1$, $lp_2$, $lp_3$, $lp_4$, and $lp_5$ can be computed efficiently, as described in the proposition. But, this weighted sum is only a partial result for t. To obtain t, this partial result must be added to the weighted sum of the remaining leaf-products in the list above.

The function below performs the multiplication of 4-word polynomials by computing the weighted sum of the leaf-products.

```
Inputs: a, b: 4-word polynomials
Output: t: 8-word polynomial
Temporary: lp_i: 2-word polynomials
/* Compute the first four leaf-products */
    lp_i := MULGF2(a[i], b[i])        i = 0, . . . , 3
/* Compute h from (23) for n = 4 */
    h[0] := lp_0[0]
    h[i] := lp_i[0] + lp_{i-1}[1]     i = 1, . . . , 3
    h[4] := lp_3[1]
/* Compute the fourth and fifth leaf-products */
    lp_4 := MULGF2(a[0] + a[2], b[0] + b[2])
    lp_5 := MULGF2(a[1] + a[3], b[1] + b[3])
/* Compute h' from (33) for n = 4 and m = 2 */
    h'[0] := lp_4[0]
    h'[1] := lp_5[0] + lp_4[1]
    h'[2] := lp_5[1]
/* Compute the partial result from (24) and (34) for n = 4
and m = 2 */
    t[0] := h[0]
    t[i] := t[i − 1] + h[i]           i = 1
    t[i] := t[i − 1] + h[i] + h'[i − 2]   i = 2, 3
    t[7] := h[4]
    t[i] := t[i + 1] + h[i − 3]       i = 6
    t[i] := t[i + 1] + h[i − 3] + h'[i − 3]   i = 5, 4
/* Compute the remaining leaf-products */
    lp_6 := MULGF2(a[0] + a[1], b[0] + b[1])
    lp_7 := MULGF2(a[2] + a[3], b[2] + b[3])
    lp_8 := MULGF2(a[0] + a[1] + a[2] + a[3], b[0] + b[1] + b[2] + b[3])
/* Update t with the weighted sum of the remaining leaf-products
in (41) */
    t[1] := t[1] + lp_6[0]
    t[2] := t[2] + lp_6[1]
    t[3] := t[3] + lp_8[0] + lp_6[0] + lp_7[0]
    t[4] := t[4] + lp_8[1] + lp_6[1] + lp_7[1]
    t[5] := t[5] + lp_7[0]
    t[6] := t[6] + lp_7[1]
```

The function above needs 38 word-additions (XOR) and 9 word-multiplications (MULGF2). Note that, when $lp_6$, $lp_7$, and $lp_8$, are computed, 4 XOR operations can be gained at the expense of additional storage.

Nonrecursive Functions to Multiply Larger Polynomials

In the previous sections, the functions KOA2, KOA3 and KOA4 were presented for multiplying 2-, 3-, and 4-word polynomials. These functions each compute a weighted sum of leaf-products that yields the output product.

The leaf-products and their weights are obtained by decomposing the output products into the leaf-products as described above. Sometimes, however, the leaf-products can be redundantly the same and their weighted sum can be simplified by algebraic manipulations. An example of this manipulation was shown with respect to KOA3.

For the multiplication of the larger polynomials, the same method can be continued to obtain their leaf-products and weights. With the increasing polynomial size, however, removing the redundancies and simplifying the weighted sum of leaf-products becomes more difficult. To overcome this problem, the leaf-products and the weights for the multiplication of the larger polynomials can be derived from the leaf-products and the weights derived for the multiplication of the smaller polynomials. Every time a new set of of the leaf-products and the weights is obtained, they can be optimized. In this fashion, each set of the leaf-products and the weights can be derived from the already optimized leaf-products and the weights. Therefore, only a minor amount of optimization is required in each derivation. This process is more fully explained in the following section.

Deriving Leaf-Products and Weights for the Multiplication of n-Word Polynomials and for the Multiplication of (n−1)-Word Polynomials Let n be an even number. Assume that the product of n/2-word polynomials can be expressed by the following weighted sum:

$$\sum_{\forall i} LeafProduct_i Weight_i. \qquad (43)$$

The leaf-products and the weights above are derived for the multiplication of n/2-word polynomials. From them, the leaf-products and the weights for the multiplication of n and (n−1)-word polynomials can be derived.

Let t be the product of the n-word polynomials a and b. The product t can be decomposed into three half-sized subproducts according to the following equation (which is similar to equation (14) above):

$$t = \text{low } (1+z^{n/2}) + \text{mid } z^{n/2} + \text{high } (z^{n/2}+z^n) \qquad (44)$$

Note that low, mid and high are the product of n/2-word polynomials:

$$\text{low} = a_L b_L$$

$$\text{mid} = (a_L + a_H)(b_L + b_H)$$

$$\text{high} = (a_H b_H) \qquad (45)$$

where n/2-word polynomials are:

$$a_L = a[0 \# n/2]$$

$$b_L = b[0 \# n/2]$$

$$a_H = a[n/2 \# n/2]$$

$$b_H = b[n/2 \# n/2] \qquad (46)$$

These terms can be expressed in the weighted sum of Equation (43) as follows:

$$\text{low} = \sum_{\forall i} LeafProduct_i(a_L, b_L) Weight_i \quad (47)$$

$$\text{mid} = \sum_{\forall i} LeafProduct_i(a_L + a_H, b_L + b_H) Weight_i$$

$$\text{high} = \sum_{\forall i} LeafProduct_i(a_H, b_H) Weight_i$$

where the $LeafProduct_i$'s are defined from the words of n/2-word polynomials.

Note that the product of the n-word polynomials, t, can be expressed with the following weighted sum:

$$t = \sum_{\forall i} LeafProduct_i(a_L, b_L) Weight_i(1 + z^{n/2}) + \quad (48)$$

$$\sum_{\forall i} LeafProduct_i(a_L + a_H, b_L + b_H) Weight_i z^{n/2} +$$

$$\sum_{\forall i} LeafProduct_i(a_H, b_H) Weight_i(z^{n/2} + z^n)$$

This weighted sum yields the product of the (n−1)-word polynomials, where the last words of a and b are zero (i.e., a[n−1]=0 and b[n−1]=0).

Then, the product of the (n−1)-word polynomials can be given by the following weighted sum:

$$t = \sum_{\forall i} LeafProduct_i(a_L, b_L) Weight_i(1 + z^{n/2}) + \quad (49)$$

$$\sum_{\forall i} LeafProduct_i(a_L + a'_H, b_L + b'_H) Weight_i z^{n/2} +$$

$$\sum_{\forall i} LeafProduct_i(a'_H, b'_H) Weight_i(z^{n/2} + z^n)$$

where $a_H'=a[n/2\#n/2-1]$ and $b_H'=b[n/2\#n/2-1]$. In summary, the leaf-products and the weights for the product of the n-word polynomials can be written as follows:

| Leaf-Products | Weights |
|---|---|
| $\sum_{\forall i} LeafProduct_i(a_L, b_L)$ | $Weight_i(1 + z^{n/2})$ |
| $\sum_{\forall i} LeafProduct_i(a_L + a_H, b_L + b_H)$ | $Weight_i z^{n/2}$ |
| $\sum_{\forall i} LeafProduct_i(a_H, b_H)$ | $Weight_i(z^{n/2} + z^n)$ |

Similarly, the leaf-products and weights for the product of the (n−1)-word polynomials can be written as follows:

| Leaf-Products | Weights |
|---|---|
| $\sum_{\forall i} LeafProduct_i(a_L, b_L)$ | $Weight_i(1 + z^{n/2})$ |
| $\sum_{\forall i} LeafProduct_i(a_L + a_H', b_L + b_H')$ | $Weight_i z^{n/2}$ |
| $\sum_{\forall i} LeafProduct_i(a_H', b_H')$ | $Weight_i(z^{n/2} + z^n)$ |

Optimizing Leaf-products and Weights

In general, in one exemplary embodiment, optimizing the leaf-products and weights means that: (1) no leaf-products are redundantly the same; and (2) the weights are in the form mentioned in Proposition 2 and its corollary. In this sense, the leaf-products and the weight which are derived for the multiplication of n-word polynomials in the previous section are optimum so long as $LeafProduct_i$ and $Weight_i$ are optimum. Further, the leaf-products and the weights which are derived for the multiplication of (n−1)-word polynomials are not optimum, even if $LeafProduct_i$ and $Weight_i$ are optimum.

This can be explained as follows. The leaf-products derived for the multiplication of (n−1)- and n-word polynomials are the same, except that a[n−1]=0 is substituted in the former. The leaf-products are the sum of the words of the inputs a and b. If two leaf-products are the sum of the same words and differ in only a[n−1], there will be no problem for n-word polynomials. However, these two leaf-products look alike for (n−1)-word polynomials. That is, the leaf-products are redundantly the same.

According to the criteria recited above, $Weight_i$ are optimum if $$Weight_i = \sum_{j=0}^{n/2-1} z^{i+j} \text{ for } i = 0, \ldots, n/2 - 1.$$

Three new sets of weights were derived, which can be rewritten as:

$$(1 + z^{n/2}) \sum_{j=0}^{n/2-1} z^{i1+j} \quad \text{for } i1 = 0, \ldots, n/2 - 1$$

$$z^{n/2} \sum_{j=0}^{n/2-1} z^{i2+j} \quad \text{for } i2 = 0, \ldots, n/2 - 1$$

$$(z^{n/2} + z^n) \sum_{j=0}^{n/2-1} z^{i3+j} \quad \text{for } i3 = 0, \ldots, n/2 - 1$$

Note that $$(1 + z^{n/2}) \sum_{j=0}^{n/2-1} z^{i1+j} + (z^{n/2} + z^n) \sum_{j=0}^{n/2-1} z^{i3+j} = \sum_{j=0}^{n/2-1} z^{i+j}$$

i=i1,i3+n/2

Thus, these weights can be written as:

$$\sum_{j=0}^{n-1} z^{i+j} \quad \text{for } i = 0, \ldots, n-1$$

$$z^{n/2} \sum_{j=0}^{n/2-1} z^{i2+j} \quad \text{for } i = 0, \ldots, n/2-1$$

These weights are in the forms mentioned in Proposition 8 and in its corollary, and thus are optimum. Thus, the leaf-products and the weights derived for n-word polynomials may not need to be optimized when the leaf-products and weights derived for (n/2)-word polynomials have already been optimized. Moreover, the leaf-products and the weights derived for (n−1)-word polynomials may need to be optimized.

Function KOA5

Let a and b be 5-word polynomials, and their product be t=ab. The product t can be decomposed into leaf-products in the manner described above. The product t may also be expressed in accordance with the algebraic manipulations described in the previous section. First, zero is substituted for the sixth words a[5] and b[5] in the leaf-product, because the polynomials, which we multiply using the KOA5 function, are of five words, not six. At the end, the following leaf-products and weights are obtained:

| i | Leaf-Products ($lp_i$) | Weights ($w_i$) |
|---|---|---|
| 0 | a[0] b[0] | $1 + z + z^2 + z^3 + z^4 + z^5$ |
| 1 | a[1] b[1] | $z + z^2 + z^3 + z^4 + z^5 + z^6$ |
| 2 | a[2] b[2] | $z^2 + z^3 + z^4 + z^5 + z^6 + z^7$ |
| 3 | a[3] b[3] | $z^3 + z^4 + z^5 + z^6 + z^7 + z^8$ |
| 4 | a[4] b[4] | $z^4 + z^5 + z^6 + z^7 + z^8 + z^9$ |
| 5 | 0 | $z^5 + z^6 + z^7 + z^8 + z^9 + z^{10}$ |
| 6 | (a[0] + a[1]) (b[0] + b[1]) | $z + z^4$ |
| 7 | (a[0] + a[2]) (b[0] + b[2]) | $z^2 + z^5$ |
| 8 | (a[1] + a[3]) (b[1] + b[3]) | $z^3 + z^6$ |
| 9 | (a[3] + a[4]) (b[3] + b[4]) | $z^4 + z^7$ |
| 10 | (a[3] + 0) (b[3] + 0) | $z^5 + z^8$ |
| 11 | (a[4] + 0) (b[4] + 0) | $z^6 + z^9$ |
| 12 | (a[0] + a[3]) (b[0] + b[3]) | $z^3 + z^4 + z^5$ |
| 13 | (a[1] + a[4]) (b[1] + b[4]) | $z^4 + z^5 + z^6$ |
| 14 | (a[2] + 0) (b[2] + 0) | $z^5 + z^6 + z^7$ |
| 15 | (a[0] + a[1] + a[3] + a[4]) (b[0] + b[1] + b[3] + b[4]) | $z^4$ |
| 16 | (a([0] + a[2] + a[3] + 0) (b[0] + b[2] + b[3] + 0) | $z^5$ |
| 17 | (a[1] + a[3] + a[4] + 0]) (b[1] + b[3] + b[4] + b[0]) | $z^6$ |

Each row above is indexed with i. The ith row contains the ith leaf-product denoted by $lp_i$ and its weight denoted by $w_i$. The value of t can be computed as the weighted sum of the leaf-products as in Equation (15).

$$t = ab = \sum_{i=0}^{17} lp_i \cdot \omega_i \qquad (50)$$

However, this does not provide any advantage in terms of computational complexity. Instead, the value of t can be expressed with a modified set of leaf-products and weights so that an efficient scheme for computing the weighted sum can be found. For this purpose, the following substitutions can be made for $lp_{16}$=(a[0]+a[2]+a[3])(b[0]+b[2]+b[3]) and $lp_{17}$=(a[1]+a[3]+a[4])(b[1]+b[3]+b[4]):

$$\begin{aligned}(a[0] + a[2] + a[3])\\(b[0] + b[2] + b[3])\end{aligned} = (a[0] + a[2])(b[0] + b[2]) + a[0]b[0] + \qquad (51)$$
$$(a[0] + a[3])(b[0] + b[3]) + a[2]b[2] +$$
$$(a[2] + a[3])(b[2] + b[3]) + a[3]b[3]$$

$$\begin{aligned}(a[1] + a[3] + a[4])\\(b[1] + b[3] + b[4])\end{aligned} = (a[1] + a[3])(b[1] + b[3]) + a[1]b[1] + \qquad (52)$$
$$(a[1] + a[4])(b[1] + b[4]) + a[3]b[3] +$$
$$(a[3] + a[4])(b[3] + b[4]) + a[4]b[4]$$

After the substitution, the result is again a weighted sum. Every distinct product in the result is defined as a leaf-product. Let $lp_i'$ denote a particular one of them. This product can appear more than once in the result with different weights. Let these different weights be added into a single weight and denoted as $w_i'$. The new leaf-products and weights become:

| i | Leaf-Products ($lp_i'$) | Weights ($w_i'$) |
|---|---|---|
| 0 | a[0] b[0] | $1 + z + z^2 + z^3 + z^4$ |
| 1 | a[1] b[1] | $z + z^2 + z^3 + z^4 + z^5$ |
| 2 | a[2] b[2] | $z^2 + z^3 + z^4 + z^5 + z^6$ |

-continued

| i | Leaf-Products ($lp_i'$) | Weights ($w_i'$) |
|---|---|---|
| 3 | a[3] b[3] | $z^3 + z^4 + z^5 + z^6 + z^7$ |
| 4 | a[4] b[4] | $z^4 + z^5 + z^6 + z^7 + z^8$ |
| 5 | (a[0] + a[3]) (b[0] + b[3]) | $z^3 + z^4$ |
| 6 | (a[1] + a[4]) (b[1] + b[4]) | $z^4 + z^5$ |
| 7 | (a[0] + a[1]) (b[0] + b[1]) | $z + z^4$ |
| 8 | (a[0] + a[2]) (b[0] + b[2]) | $z^2$ |
| 9 | (a[1] + a[2]) (b[1] + b[2]) | $z^3$ |
| 10 | (a[2] + a[3]) (b[2] + b[3]) | $z^5$ |
| 11 | (a[2] + a[4]) (b[2] + b[4]) | $z^6$ |
| 12 | (a[3] + a[4]) (b[3] + b[4]) | $z^4 + z^7$ |
| 13 | (a[0] + a[1] + a[3] + a[4]) (b[0] + b[1] + b[3] + b[4]) | $z^4$ |

The function below performs the multiplication of 5-word polynomials, by computing the weighted sum of the leaf-products.

```
Inputs: a, b: 5-word polynomials
Output: t: 10-word polynomial
Temporary: lp_i: 2-word polynomials
/* Compute the first four leaf-products */
    lp_i := MULGF2(a[i], b[i])        i = 0, ..., 4
/* Compute h from (23) for n = 5 */
    h[0] := lp_0[0]
```

The function above needs 57 word-additions (XOR) and 14 word-multiplications (MULGF2). Note that when $lp_7$, $lp_{12}$, and $lp_{13}$ are computed, 4 XOR operations are gained at the expense of additional storage.

Function KOA6

Let a and b be 6-word polynomials, and their product be t=ab. The t can be decomposed into the leaf-products as follows:

| i | Leaf-Products ($lp_i$) | Weights ($w_i$) |
|---|---|---|
| 0 | a[0] b[0] | $1 + z + z^2 + z^3 + z^4 + z^5$ |
| 1 | a[1] b[1] | $z + z^2 + z^3 + z^4 + z^5 + z^6$ |
| 2 | a[2] b[2] | $z^2 + z^3 + z^4 + z^5 + z^6 + z^7$ |
| 3 | a[3] b[3] | $z^3 + z^4 + z^5 + z^6 + z^7 + z^8$ |
| 4 | a[4] b[4] | $z^4 + z^5 + z^6 + z^7 + z^8 + z^9$ |
| 5 | a[5] b[5] | $z^5 + z^6 + z^7 + z^8 + z^9 + z^{10}$ |
| 6 | (a[0] + a[1]) (b[0] + b[1]) | $z + z^4$ |
| 7 | (a[0] + a[2]) (b[0] + b[2]) | $z^2 + z^5$ |
| 8 | (a[1] + a[3]) (b[1] + b[3]) | $z^3 + z^6$ |
| 9 | (a[3] + a[4]) (b[3] + b[4]) | $z^4 + z^7$ |
| 10 | (a[3] + a[5]) (b[3] + b[5]) | $z^5 + z^8$ |
| 11 | (a[4] + a[5]) (b[4] + b[5]) | $z^6 + z^9$ |
| 12 | (a[0] + a[3]) (b[0] + b[3]) | $z^3 + z^4 + z^5$ |
| 13 | (a[1] + a[4]) (b[1] + b[4]) | $z^4 + z^5 + z^6$ |
| 14 | (a[2] + a[5]) (b[2] + b[5]) | $z^5 + z^6 + z^7$ |
| 15 | (a[0] + a[1] + a[3] + a[4]) (b[0] + b[1] + b[3] + b[4]) | $z^4$ |
| 16 | (a[0] + a[2] + a[3] + a[5]) (b[0] + b[2] + b[3] + b[5]) | $z^5$ |
| 17 | (a[1] + a[3] + a[4] + a[5]) (b[1] + b[3] + b[4] + b[5]) | $z^6$ |

-continued

```
    h[i] := lp_i[0] + lp_{i-1}[1]     i = 1, ..., 4
    h[5] := lp_4[1]
/* Compute the fourth and fifth leaf-products */
    lp_5 := MULGF2(a[0] + a[3], b[0] + b[3])
    lp_6 := MULGF2(a[1] + a[4], b[1] + b[4])
/* Compute h' from (33) for n = 5 and m = 3 */
    h'[0] := lp_5[0]
    h'[1] := lp_6[0] + lp_5[1]
    h'[2] := lp_6[1]
/* Compute the partial result from (24) and (34) for n = 5 and m = 3 */
    t[0] := h[0]
    t[i] := t[i - 1] + h[i]                      i = 1, 2
    t[i] := t[i - 1] + h[i] + h'[i - 3]          i = 3, 4
    t[9] := h[5]
    t[i] := t[i + 1] + h[i - 4]                  i = 8, 7
    t[i] := t[i + 1] + h[i - 4] + h'[i - 4]      i = 6, 5
/* Compute the remaining leaf-products */
    lp_7 := MULGF2(a[0] + a[1], b[0] + b[1])
    lp_8 := MULGF2(a[0] + a[2], b[0] + b[2])
    lp_9 := MULGF2(a[1] + a[2], b[1] + b[2])
    lp_{10} := MULGF2(a[2] + a[3], b[2] + b[3])
    lp_{11} := MULGF2(a[2] + a[4], b[2] + b[4])
    lp_{12} := MULGF2(a[3] + a[4], b[3] + b[4])
    lp_{13} := MULGF2(a[0] + a[1] + a[3] + a[4], b[0] + b[1] +
              b[3] + b[4])
/* Update t with the weighted sum of the remaining leaf-products */
    t[1] := t[1] + lp_7[0]
    t[2] := t[2] + lp_7[1] + lp_8[0]
    t[3] := t[3] + lp_9[0] + lp_8[1]
    t[4] := t[4] + lp_9[1] + lp_{13}[0] + lp_7[0] + lp_{12}[0]
    t[5] := t[5] + lp_{10}[0] + lp_{13}[1] + lp_7[1] + lp_{12}[1]
    t[6] := t[6] + lp_{10}[1] + lp_{11}[0]
    t[7] := t[7] + lp_{12}[0] + lp_{11}[1]
    t[8] := t[8] + lp_{12}[1]
```

The function below performs the multiplication of 6-word polynomials, by computing the weighted sum of the leaf-products.

```
Inputs: a, b: 6-word polynomials
Output: t: 12-word polynomial
Temporary: lp_i: 2-word polynomials
/* Compute the first six leaf-products */
    lp_i := MULGF2(a[i], b[i])        i = 0, ..., 5
/* Compute h from (23) for n = 6 */
    h'[0] := lp_0[0]
    h'[i] := lp_i[0] + lp_{i-1}[1]    i = 1, ..., 5
    h'[6] := lp_5[1]
/* Compute the 12th, 13th and 14th leaf-products */
    lp_{12} := MULGF2(a[0] + a[3], b[0] + b[3])
    lp_{13} := MULGF2(a[1] + a[4], b[1] + b[4])
    lp_{14} := MULGF2(a[2] + a[5], b[2] + b[5])
/* Compute h' from (33) for n = 6 and m = 3 */
    h'[0] := lp_{12}[0]
    h'[1] := lp_{13}[0] + lp_{12}[1]
    h'[2] := lp_{14}[0] + lp_{13}[1]
    h'[3] := lp_{14}[1]
/* Compute the partial result from (24) and (34) for n = 6 and m = 3 */
    t[0] := h[0]
    t[i] := t[i - 1] + h[i]                      i = 1, 2
    t[i] := t[i - 1] + h[i] + h'[i - 3]          i = 3, 4, 5
    t[11] := h[6]
    t[i] := t[i + 1] + h[i - 5]                  i = 10, 9
    t[i] := t[i + 1] + h[i - 5] + h'[i - 5]      i = 8, 7, 6
/* Compute the remaining leaf-products */
    lp_6 := MULGF2(a[0] + a[1], b[0] + b[1])
    lp_7 := MULGF2(a[0] + a[2], b[0] + b[2])
    lp_8 := MULGF2(a[1] + a[3], b[1] + b[3])
    lp_9 := MULGF2(a[3] + a[4], b[3] + b[4])
    lp_{10} := MULGF2(a[3] + a[5], b[3] + b[5])
    lp_{11} := MULGF2(a[4] + a[5], b[4] + b[5])
```

-continued

```
lp_15 := MULGF2(a[0] + a[1] + a[3] + a[4], b[0] + b[1] +
    b[3] + b[4])
lp_16 := MULGF2(a[0] + a[2] + a[3] + a[5], b[0] + b[2] +
    b[3] + b[5])
lp_17 := MULGF2(a[1] + a[3] + a[4] + a[5], b[1] + b[3] +
    b[4] + b[5])
/* Update t with the weighted sum of the remaining leaf-
products */
    t[1] := t[1] + lp_6[0]
    t[2] := t[2] + lp_6[1] + lp_7[0]
    t[3] := t[3] + lp_8[0] + lp_7[1]
    t[4] := t[4] + lp_8[1] + lp_9[0] + lp_6[0] + lp_15[0]
    t[5] := t[5] + lp_10[0] + lp_9[1] + lp_6[1] + lp_15[1] + lp_16[0]
    t[6] := t[6] + lp_10[1] + lp_11[0] + lp_8[0] + lp_17[0] + lp_16[1]
    t[7] := t[7] + lp_9[0] + lp_11[1] + lp_8[1] + lp_17[1]
    t[8] := t[8] + lp_9[1] + lp_10[0]
    t[9] := t[9] + lp_11[0] + lp_10[1]
    t[10] := t[10] + lp_11[1]
```

The function above needs 81 word-additions (XOR) and 18 word-multiplications (MULGF2). Note that when the remaining leaf-products are computed and the result updated with their weighted sum, 9 XOR operations are gained. Additional storage, however, may be needed to achieve this gain.

Performance Analysis

The performance of the disclosed $GF(2^m)$ multiplication methods mainly depend on the performance of the particular LKOA implemented. The cost of the modulo reduction operation is typically less significant if a trinomial or pentanomial is selected as the irreducible polynomial. In the following table, the number of XOR and MULGF2 operations required to multiply polynomials having a size between 2 and 6 words using standard multiplication, the KOA, and the LKOA described above is given.

|        |          | Polynomial Size n | | | | |
|--------|----------|---|---|---|---|---|
|        |          | 2 | 3 | 4 | 5 | 6 |
| XOR    | Standard | 4 | 12 | 24 | 40 | 60 |
|        | KOA      | 8 | 28 | 40 | 84 | 108 |
|        | LKOA     | 7 | 18 | 38 | 57 | 81 |
| MULGF2 | Standard | 4 | 9 | 16 | 25 | 36 |
|        | KOA      | 3 | 7 | 9 | 17 | 21 |
|        | LKOA     | 3 | 6 | 9 | 14 | 18 |

As seen in Table 6, the standard multiplication needs $n^2$ MULGF2 operations to compute the partial products and needs $2n(n-1)$ XOR operations to combine these partial products. The number of XOR and MULGF2 operations required for the KOA is calculated using a computer program, such as a Maple program. As seen from Table 6, the LKOA and the KOA need more XOR operations. However, the LKOA and the KOA need fewer MULGF2 operations than the standard multiplication. Because the emulation of MULGF2 is very costly, the LKOA and the KOA outperform the standard multiplication.

In comparison to other methods, $GF(2^m)$ multiplication with the LKOA is more efficient, can be implemented in software in a computer-based environment, does not require a look-up table, and does not have a restriction on the field size m. Although the LKOA may require extra code size, the overall code size is still very reasonable. For example, the code for the particular implementation discussed above in the C programming language requires at most 5 kbytes.

A multiplication method using both the LKOA and the KOA for calculating polynomials in $GF(2^m)$ may be implemented in software. Trinomials and pentanomials may be used for the reduction procedure that follows multiplication. Table 7 gives the timing results for two particular implementations for multiplying $GF(2^m)$: (1) the LKOA; and (2) the KOA.

TABLE 7

Timing results for $GF(2^m)$ multiplication by the KOA and the LKOA

| Field Size m | 163 | 211 | 233 | 283 |
|---|---|---|---|---|
| Field Size in words (n = [m/32]) | 6 | 7 | 8 | 9 |
| $GF(2^m)$ multiplication by KOA | 9.2 μs | 10.2 μs | 10.6 μs | 18.8 μs |
| $GF(2^m)$ multiplication by LKOA | 5.0 μs | 6.3 μs | 6.7 μs | 10.3 μs |

The multiplication time for the finite fields $GF(2^{163})$, $GF(2^{211})$, $GF(2^{233})$, and $GF(2^{283})$, which are commonly used in the elliptic curve cryptography, were measured. The particular platform used in the measurement was a 450-MHZ Pentium II machine with 256 Mbyte RAM. The timing results show that the LKOA is nearly two times faster than the KOA for $GF(2^m)$ multiplication.

An Example of Multiplication Using a Nonrecursive Algorithm

Figure 6:
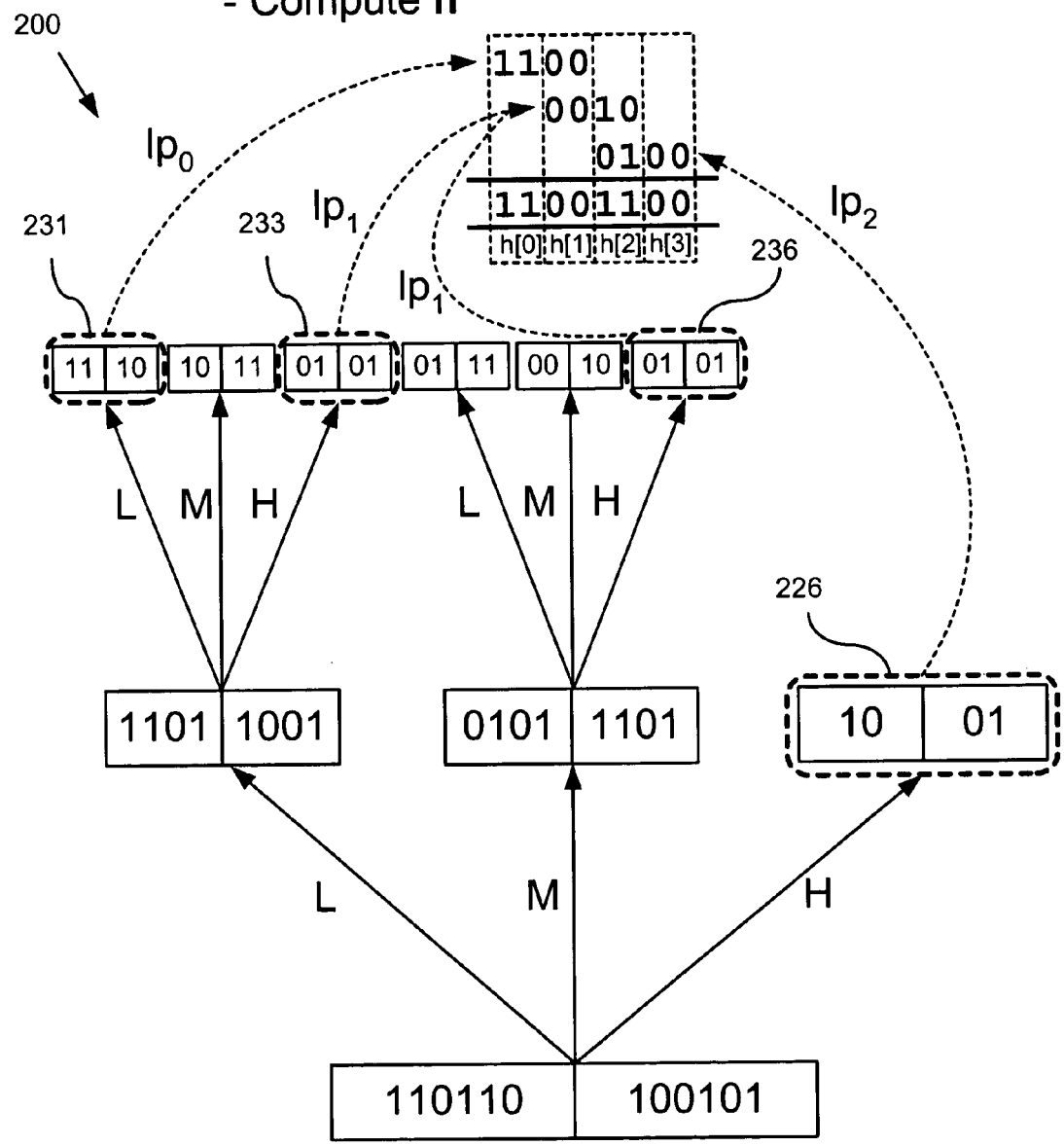
FIG. 6 is a first block diagram illustrating the operation of the method of FIGS. 1 and 5 using the recursion tree of FIG. 2.
Figure 7:
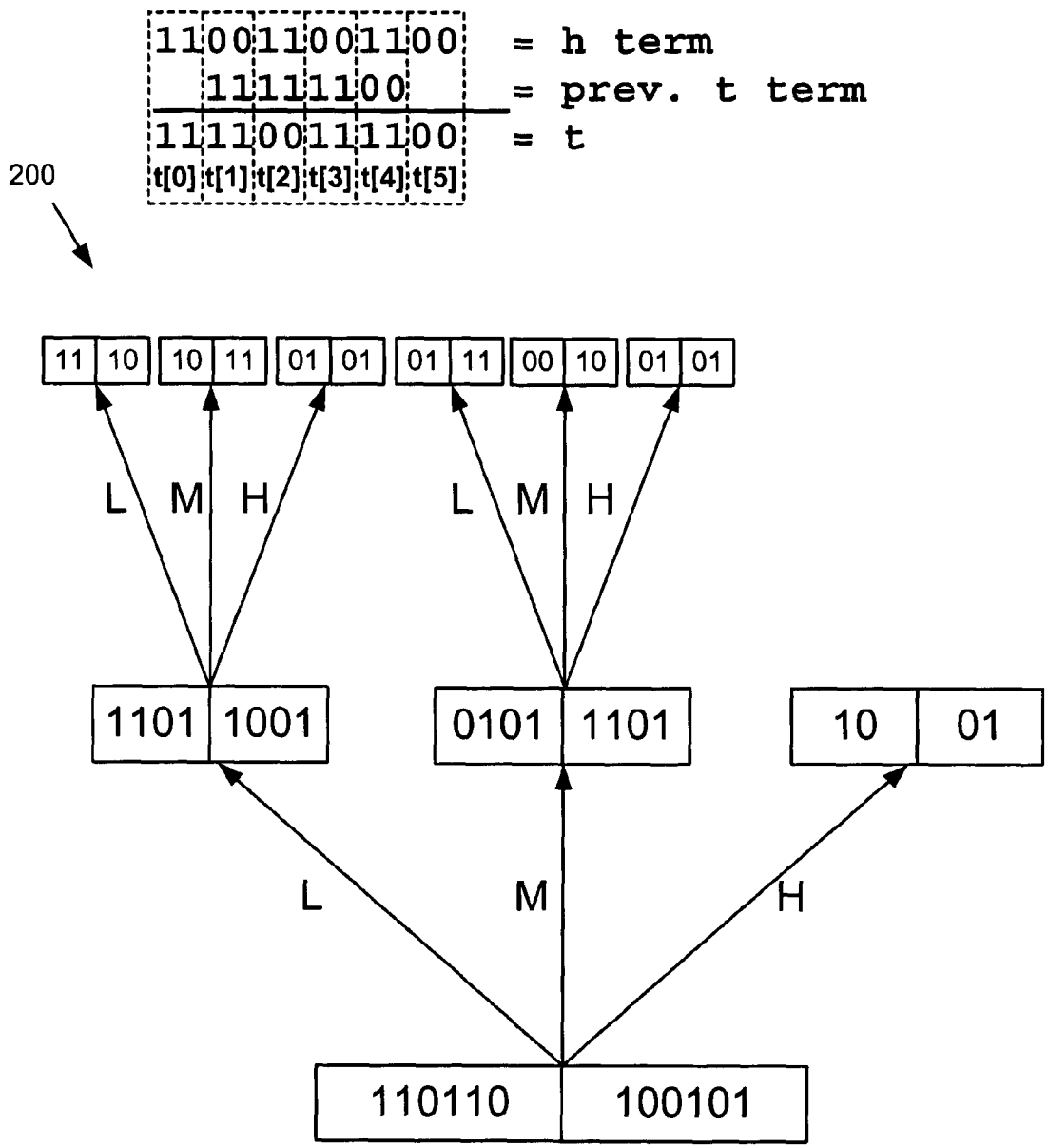
FIG. 7 is a second block diagram illustrating the operation of the method of FIGS. 1 and 5 using the recursion tree of FIG. 2.
Figure 8:
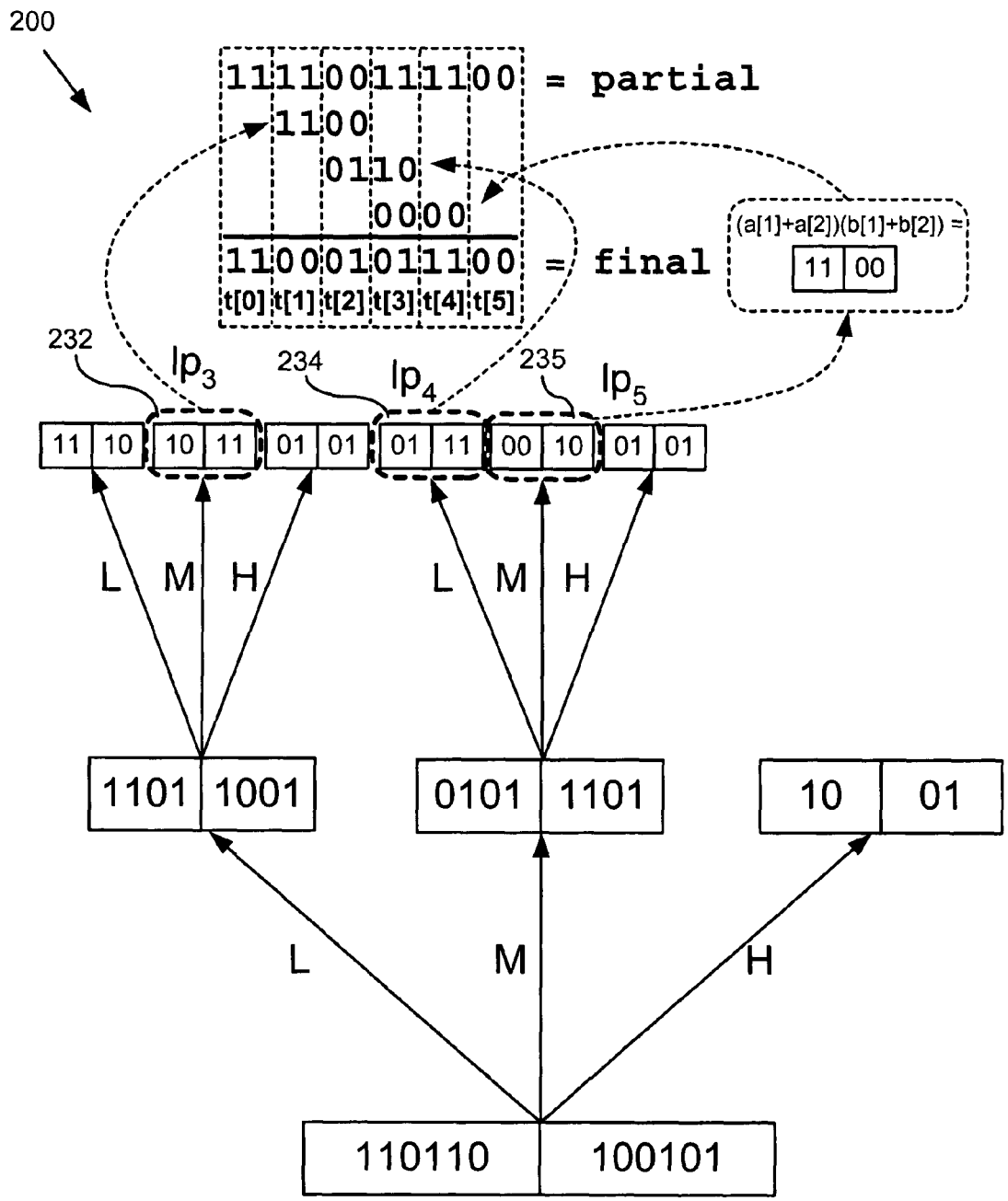
FIG. 8 is a third block diagram illustrating the operation of the method of FIGS. 1 and 5 using the recursion tree of FIG. 2.

The operation of one of the nonrecursive algorithms is illustrated in the following example and in FIGS. 6 through 8. In particular, FIGS. 6 through 8 illustrate the operation of the KOA3 algorithm by relating it to the recursion tree of FIG. 2. In this example, two polynomials "110110" and "100101" (i.e., $1+x+x^3x+x^4$ and $1+x^{3+x5}$) are multiplied together. Both polynomials comprise three two-bit words. Thus, the operand size is n=3, and the word size is w=2. Let a denote 110110 and a[i] denote the ith word of 110110. Also, let b denote 100101 and b[i] denote the ith word of 100101.

The first process in the KOA3 algorithm is to compute the first three leaf-products $lp_0$, $lp_1$, and $lp_2$. In particular, these subproducts are $lp_0=11*10=1100$, $lp_1=01*01=0010$, and $lp_2=10*01=0100$. As shown in F these subproducts correspond to branches of the related recursion tree. In particular, $lp_0$ corresponds to branch 231, $lp_1$ corresponds to branches 233 and 236, and $ip_2$ corresponds to branch 226.

The second process in the KOA3 algorithm is to compute h from these leaf-products according to Equation (23). In particular, h is computed as follows:

$$h[0]:=lp_0[0]$$

$$h[i]:=lp_i[0]+lp_{i-1}[1]\, i=1,\ldots,2$$

$$h[3]:=lp_2[1]$$

FIG. 6 shows this computation as a weighted sum of word-shifted versions of the leaf-products.

The third process in the KOA3 algorithm is to compute the partial result according to the following weighted sum:

$$t[0]:=h[0]$$

$$t[i]:=t[i-1]+h[i]\, for\, i=1,2$$

$$t[5]:=h[3]$$

$$t[i]:=t[i+1]+h[i-2]\, for\, i=4,3$$

FIG. 7 illustrates this computation as a weighted sum of the individual words from h combined with previously calculated terms. For instance, t[0] is calculated first. Then, t[1] is calculated from h[1] and the previously calculated value of t[0].

Similarly, t[5] is calculated after t[0] through t[2]. Then, t[4] is calculated as the sum of h[4] and the previously calculated value of t[5]. In this manner, the partial result is determined by storing and reusing previously calculated values, thereby reducing the number of XOR operations required to obtain the partial result.

The fourth process in the KOA3 algorithm is to determine the remaining leaf-products $lp_3$, $lp_4$, and $lp_5$. In particular, these subproducts are $lp_3$=10*11=1100, $lp_4$=01*11=0110, and $lp_5$=11*00 =0000. As shown in FIG. 8, these subproducts correspond to branches of the related recursion tree. In particular, $lp_3$ corresponds to branch 232, $lp_4$ corresponds to branch 234, and $lp_5$ corresponds to branch 235. Note that $lp_5$ no longer corresponds precisely to branch 235, but has instead been modified through the algebraic substitutions recited above to comprise the subproduct (a[1]+a[2])(b[1]+b[2]). As more fully discussed above, the algebraic substitutions can performed to maximize the number of one-word subproducts having weights in the form $$\sum_{j=0}^{n-1} z^{i+j}$$

for i=0, . . . , n−1, which can be efficiently calculated.

The fifth process in the KOA3 algorithm is to update the partial result with the remaining leaf-products. In particular, this update is performed as follows:

$t[1]:=t[1]+lp_3[0]$ $t[2]:=t[2]+lp_3[1]+lp_4[0]$ $t[3]:=t[3]+lp_5[0]+lp_4[1]$ $t[4]:=t[4]+lp_5[1]$

FIG. 8 illustrates this computation as a weighted sum of word-shifted versions of the remaining leaf-products. As a result of this computation, the final result is obtained. The final result may then be used as part of a recursive algorithm to compute the product of operands having a larger word size.

Applications of the LKOA

The methods described above may be used in a variety of different applications wherein multiplication of multi-precision numbers is performed. For example, the methods may be used in a software program that performs arbitrary-precision arithmetic (e.g., Mathematica) or in other specialized or general-purpose software implementations. Additionally, the methods may be used in the field of cryptography, which often involves the manipulation of large multi-precision numbers. For example, the methods may be used to at least partially perform the calculation of a variety of different cryptographic parameters. These cryptographic parameters may include, for instance, a public key, a private key, a ciphertext, a plaintext, a digital signature, or a combination of these parameters. Cryptographic systems that may benefit from the disclosed methods and apparatus include, but are not limited to, systems using the RSA algorithm, the Diffie-Hellman key exchange algorithm, the Digital Signature Standard (DSS), elliptic curves, the Elliptic Curve Digital Signature Algorithm (ECDSA), or other algorithms.

In one particular implementation, the methods are used, at least in part, to generate and verify a key pair or to generate and verify a signature according to the ECDSA. For example, the methods may be used to compute Q=dG during the key pair generation process, wherein Q is a public key, d is a private key, and G is a base point. Moreover, the methods may be used to verify that nQ=O during the key pair verification process, wherein n is the order of the point G, and O is the point at infinity of the elliptic curve. Similarly, the methods may be used to compute kG=($x_1$,$y_1$), wherein k is a random or pseudorandom integer, and ($x_1$, $y_1$) are points on an elliptic curve. The methods may similarly be used to calculate the related modular, inverse modular, and hash functions during the signature generation and verification processes.

Figure 9:
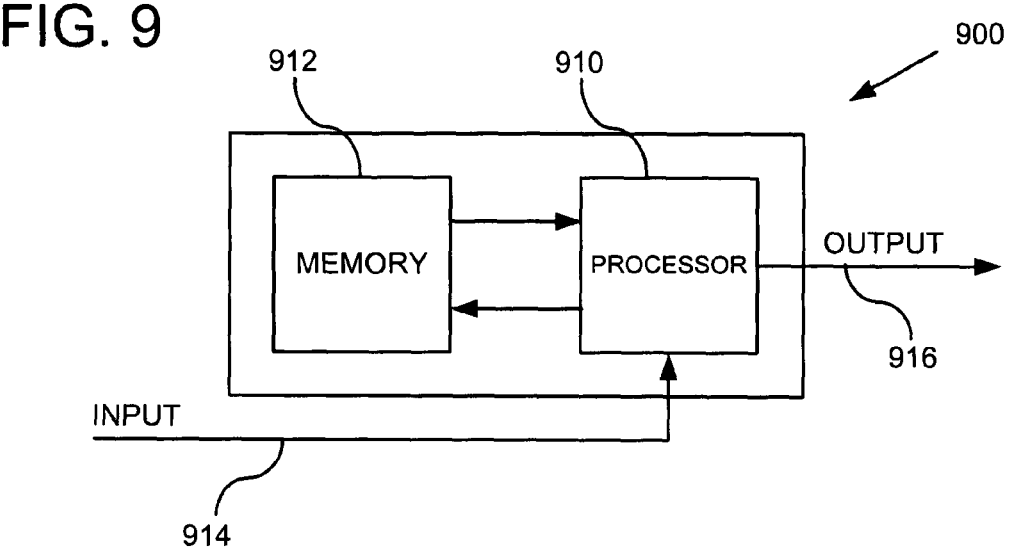
FIG. 9 is a block diagram of a general-purpose computer configured to perform multi-precision multiplication according to the disclosed methods.

Any of the methods described above may be implemented in a number of different hardware and/or software environments. FIG. 9 shows a block diagram of one exemplary general hardware implementation. More particularly, FIG. 9 shows a multiplying apparatus 900 (e.g., a computer) that includes a processor 910 (e.g., a microprocessor), memory 912 (e.g., RAM or ROM) and an input data path 914. Any one of the multiplication methods described above may be stored in the memory or on a computer-readable medium (e.g., hard disk, CD-ROM, DYD, floppy disk, RAM, ROM) that is separate from the memory 912 and accessible by the processor 910 before or during execution of the algorithm. During operation, the input operands (e.g., polynomials) may be supplied via the input data path 914 or by the memory 912. The processor 910 and the memory 912 are coupled together via the data paths 916, which enable the various read and write operations performed during the algorithm. The final product computed by the processor 910 may be output from the processor on output data path 916 or stored in the memory 912 for later use. The details of this general hardware implementation are omitted.

Figure 10:
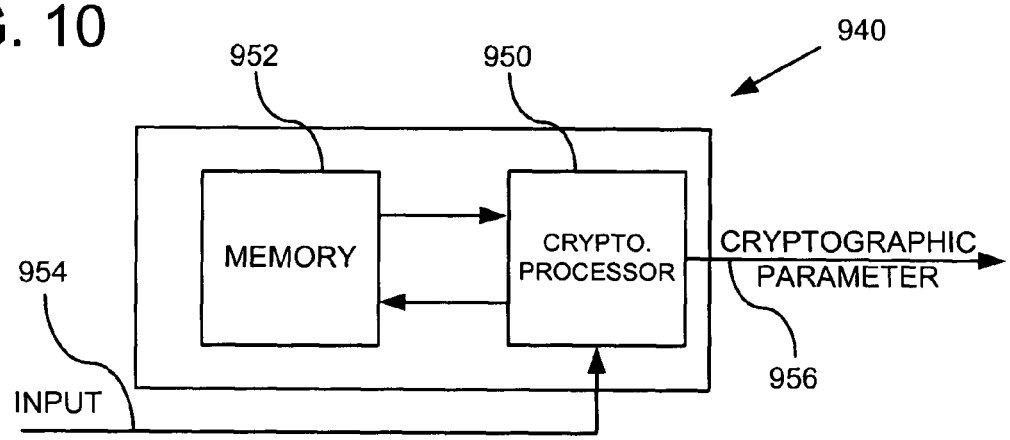
FIG. 10 is a block diagram of a cryptographic system configured to perform multi-precision multiplication according to the disclosed methods and to output a cryptographic parameter.

As noted, the disclosed methods may be used in cryptography to help compute a variety of cryptographic parameters using multi-precision multiplication. FIG. 10 shows a block diagram of a general cryptographic apparatus 940 that may be used to multiply two operands to produce a cryptographic parameter. The apparatus 940 includes a cryptographic processor 950 used to perform the algorithm; memory 952 used to store the operands, the intermediate results, and computer-executable instructions for performing the algorithm; and an input data path 954. The apparatus 940 operates much like the apparatus described in FIG. 9, but produces a cryptographic parameter at its output 956. The cryptographic parameter may be related to or constitute a portion of a public key, private key, ciphertext, plaintext, digital signature, or some combination thereof. The parameter may also constitute a number of other values used in cryptography. The cryptographic apparatus 940 may be included in a variety of security applications. For instance, the apparatus 940 may be included in a secure transaction server used for financial transactions, confidential record storage, SmartCards, and cell phones.

In view of the many possible implementations, it will be recognized that the illustrated embodiments include only examples and should not be taken as a limitation on the scope of the disclosed technology. Instead, the invention is intended to encompass all alternatives, modifications, and equivalents as may be included within the spirit and scope of the technology defined by the following claims.

What is claimed is:

1. A computer-implemented cryptographic method of multiplying a first polynomial and a second polynomial over a finite field having $2^m$ elements, wherein m is a positive integer, comprising:

representing the first polynomial and the second polynomial as an array of n words having a size of at least two bits, wherein n is an integer;

using a recursive algorithm to decompose a multiplication of the first polynomial and the second polynomial into a weighted sum of iteratively smaller subproducts;

using a nonrecursive algorithm to complete the multiplication when a size of the smaller subproducts is less than or equal to a predetermined size, the predetermined size being at least two words; and storing a cryptographic parameter associated with the multiplication in a memory.

2. The method of claim 1, wherein the predetermined size is six words.

3. The method of claim 1, wherein the recursive multiplication algorithm is a Karatsuba-Ofman algorithm.

4. The method of claim 1, wherein the step of using a nonrecursive multiplication algorithm includes the step of excluding pairs of redundant subproducts.

5. The method of claim 1, wherein the nonrecursive multiplication algorithm stores and reuses previously calculated intermediate values to determine subsequent intermediate values.

6. The method of claim 5, wherein the previously calculated intermediate values are used to determine a weighted sum of subproducts having weights of the form $$\sum_{j=0}^{n-1} z^{i+j}$$

for i=0, . . . , n−1, wherein i and j are index integers.

7. The method of claim 6, wherein the subproducts having weights of $$\sum_{j=0}^{n-1} z^{i+j}$$

for i=0, . . . , n−1 are one-word subproducts $lp_i$ of a corresponding recursion tree, and the weighted sum of the subproducts is denoted as t, the method further comprising:

calculating a (n+1)-word polynomial h from the one-word subproducts $lp_i$ wherein, $h[0]=lp_0[0]$, $h[i]=lp_i[0]+lp_{i-1}[1]$, for i=1,. . . ,n−m−1, $h[n-m]=lp_{n-m-1}[1]$, where h[i] is the ith word of h and m−1 is a degree of the first polynomial; and calculating a weighted sum t from words of h, wherein $t[i]=h[i]$, for i=0, $t[i]=t[i-1]+h[i]$, for 0<i≦n−1, $t[i]=h[i-n+1]$, for i=2n−1, $t[i]=t[i+1]+h[i-n+1]$, for n≦i<2n−1, where t[i] is the ith word of t.

8. The method of claim 1, wherein at least one of the first and the second polynomials corresponds to at least a portion of a private key, and a product of the first polynomial and the second polynomial corresponds to a public key.

9. The method of claim 1, wherein the first polynomial and the second polynomial are cryptographic parameters and the multiplication is associated with signature generation.

10. The method of claim 9, wherein the signature generation is associated with an elliptic curve digital signature.

11. The method of claim 1, wherein the first polynomial and the second polynomial are associated with cryptographic parameters and the multiplication is associated with signature verification.

12. The method of claim 11, wherein the signature verification is associated with an elliptic curve digital signature.

13. A computer-readable medium storing a sequence of instructions that when executed cause a computer to perform a cryptographic method of multiplying a first polynomial and a second polynomial over a finite field having $2^m$ elements, wherein m is a positive integer, the method comprising:

representing the first polynomial and the second polynomial as an array of n words having a size of at least two bits, wherein n is an integer;

using a recursive algorithm to decompose a multiplication of the first polynomial and the second polynomial into a weighted sum of iteratively smaller subproducts; and using a nonrecursive algorithm to complete the multiplication when a size of the smaller subproducts is less than or equal to a predetermined size, the predetermined size being at least two words; and storing a cryptographic parameter associated with the multiplication in a memory.

14. A computer-implemented cryptographic method of multiplying a first polynomial and a second polynomial over a finite field having $2^m$ elements, wherein m is a positive integer:

representing the first polynomial and the second polynomial as n words having a size of at least two bits, wherein n is an integer greater than one;

determining a partial result by calculating a weighted sum of one-word subproducts having weights of a form $$\sum_{j=0}^{n-1} z^{i+j}$$

for i=0, . . . , n−1, wherein i and j are index integers;

updating the partial result by adding remaining one-word subproducts; and storing a cryptographic parameter associated with the multiplication in a memory.

15. The method of claim 14, further comprising identifying and excluding pairs of redundant one-word subproducts.

16. The method of claim 14, wherein the determining the partial result comprises:

storing intermediate calculations in the memory; and reusing the stored intermediate calculations.

17. The method of claim 14, wherein the one-word subproducts are denoted as leaf-products $lp_i$, and the determining the partial result comprises:

calculating a (n+1)-word polynomial h from the leaf-products $lp_i$, wherein, $h[0]=lp_0[0]$, $h[i]=lp_i[0]+lp_{i-1}[1]$, for i=1, . . . ,n−m−1, $h[n-m]=lp_{n-m-1}[1]$, where h[i] is the ith word of h and m−1 is a degree of the first polynomial; and calculating a weighted sum t from words of h, wherein:

$t[i]=h[i]$, for $i=0$, $t[i]=t[i-1]+h[i]$, for $0<i\leq n-1$, $t[i]=h[i-n+1]$, for $i=2_{n}-1$, $t[i]=t[i+1]+h[i-n+1]$, for $n \leq i<2_{n}-1$, where t[i] is the ith word of t.

18. The method of claim 14, wherein at least one of the first and the second polynomials is associated with a private key, and a product of the first polynomial and the second polynomial is associated with a public key.

19. The method of claim 14, wherein the first polynomial and the second polynomial are cryptographic parameters and the multiplication is associated with signature generation.

20. The method of claim 19, wherein the signature generation is associated with an elliptic curve digital signature.

21. The method of claim 14, wherein the first polynomial and the second polynomial are cryptographic parameters and the multiplication is associated with signature verification.

22. The method of claim 21, wherein the signature verification process is associated with an elliptic curve digital signature.

23. A computer-readable medium storing a sequence of instructions that when executed cause a computer to perform a cryptographic method of multiplying a first polynomial and a second polynomial over a finite field having $2^m$ elements, wherein m is a positive integer, the method comprising:
 representing the first polynomial and the second polynomial as n words having a size of at least two bits, wherein n is an integer greater than one;
 determining a partial result by calculating a weighted sum of one-word subproducts having weights of a form $$\sum_{j=0}^{n-1} z^{i+j}$$

for $i=0, \ldots, n-1$, wherein i and j are index integers;
 updating the partial result by adding remaining one-word subproducts; and
 storing a cryptographic parameter associated with the multiplication in a memory.

24. A computer-implemented cryptographic method of multiplying a first polynomial and a second polynomial over a finite field having $2^m$ elements, wherein m is a positive integer:
 representing a product of the first polynomial and the second polynomial as a weighted sum of one-word subproducts;
 identifying pairs of redundant one-word subproducts;
 removing the pairs of redundant one-word subproducts from the weighted sum, thereby obtaining a revised weighted sum; and
 storing a cryptographic parameter associated with the multiplication in a memory.

25. The method of claim 24, wherein the first polynomial and the second polynomial have n−1 words, where n is an even integer, and wherein the first and the second polynomials are padded with zeros such that the first polynomial and the second polynomial can be represented as n words.

26. The method of claim 25, wherein the zero-padded words of the first and the second polynomials are excluded from the revised weighted sum.

27. The method of claim 24, further comprising identifying the one-word subproducts having weights of a form $$\sum_{j=0}^{n-1} z^{i+j}$$

for $i=0, \ldots, n-1$ through algebraic substitutions, wherein i and j are index integers, and n is a number of words in the first and second polynomials.

28. The method of claim 27, further comprising calculating a weighted sum of the one-word subproducts having weights of $$\sum_{j=0}^{n-1} z^{i+j}$$

for $i=0, \ldots, n-1$ by storing and reusing intermediate calculations.

29. A computer-readable medium storing a sequence of instructions that when executed cause a computer to perform a cryptographic method of multiplying a first polynomial and a second polynomial over a finite field having $2^m$ elements, wherein m is a positive integer, the method comprising:
 representing a product of the first polynomial and the second polynomial as a weighted sum of one-word subproducts;
 identifying pairs of redundant one-word subproducts;
 removing the pairs of redundant one-word subproducts from the weighted sum, thereby obtaining a revised weighted sum; and
 storing a cryptographic parameter associated with the multiplication in a memory.

30. A computer-implemented cryptographic method, comprising:
 receiving a first operand and a second operand, the first operand and the second operand representing a first polynomial over a finite field having $2^m$ elements, wherein m is a positive integer, and a second polynomial over the finite field having $2^m$ elements;
 multiplying the first operand and the second operand in a multiplication process, the multiplication process comprising:
 using a recursive algorithm to reduce the multiplication of the first operand and the second operand into a weighted sum of smaller subproducts; and
 using a nonrecursive algorithm to multiply the smaller subproducts when a size of the smaller subproducts is less than or equal to a predetermined size, the predetermined size being at least two words;
 storing a cryptographic parameter associated with the multiplication in a memory; and outputting the cryptographic parameter associated with the multiplication.

31. The method of claim 30, wherein the predetermined size is six words.

32. The method of claim 30, wherein the recursive multiplication algorithm is a Karatsuba-Ofman algorithm.

33. The method of claim 30, wherein the nonrecursive multiplication algorithm excludes pairs of redundant subproducts.

34. The method of claim 30, wherein the nonrecursive multiplication algorithm uses previously calculated, stored weighted sums to determine subsequent weighted sums.

35. The method of claim 30, wherein at least one of the operands corresponds to a private key, and the cryptographic parameter is a public key.

36. The method of claim 30, wherein the cryptographic parameter is associated with digital signature generation or digital signature verification.

37. The method of claim 36, wherein the signature generation is associated with an elliptic curve digital signature.

38. A cryptographic apparatus comprising:
  means for receiving a first polynomial and a second polynomial over a finite field having $2^m$ elements, wherein m is a positive integer;
  means for storing the first polynomial and the second polynomial as a series of words;
  a processor for executing computer-readable instructions for recursively multiplying the first polynomial and the second polynomial by dividing the stored first and second polynomials into multiple smaller subproducts until an input size of the subproducts is less than a predetermined size and for executing-computer-readable instructions for nonrecursively multiplying the subproducts when the size of the inputs is less than the predetermined size, the predetermined size being at least two words; and
  means for outputting the product of the first polynomial and the second polynomial.

* * * * *